US012379689B2

(12) United States Patent
Hayashi et al.

(10) Patent No.: US 12,379,689 B2
(45) Date of Patent: Aug. 5, 2025

(54) PULL-IN APPARATUS, IMAGE FORMING APPARATUS, SHEET ACCOMMODATING APPARATUS, AND DRAW-OUT UNIT

(71) Applicant: CANON KABUSHIKI KAISHA, Tokyo (JP)

(72) Inventors: Takehiro Hayashi, Kawasaki (JP); Takeo Kawanami, Kamakura (JP); Fumiya Sawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 17/983,336

(22) Filed: Nov. 8, 2022

(65) Prior Publication Data

US 2023/0053404 A1 Feb. 23, 2023

Related U.S. Application Data

(63) Continuation of application No. 16/776,897, filed on Jan. 30, 2020, now Pat. No. 11,524,852.

(30) Foreign Application Priority Data

Feb. 19, 2019 (JP) ................................ 2019-027867

(51) Int. Cl.
*G03G 21/18* (2006.01)
*G03G 21/16* (2006.01)

(52) U.S. Cl.
CPC ..... *G03G 21/1842* (2013.01); *G03G 21/1623* (2013.01); *G03G 21/1647* (2013.01); *B65H 2402/60* (2013.01)

(58) Field of Classification Search
CPC ........... G03G 15/6502; G03G 21/1842; G03G 2215/00383; B65H 2402/5155; B65H 2402/64; B65H 1/266; B65H 2402/60
See application file for complete search history.

(56) References Cited

U.S. PATENT DOCUMENTS 7,469,892 B2 12/2008 Iwase et al. ............. B65H 1/22
8,229,320 B2 * 7/2012 Kimizuka .......... G03G 21/1647 399/111

(Continued)

FOREIGN PATENT DOCUMENTS

CN 1959543 5/2007
CN 101625533 1/2010

(Continued)

OTHER PUBLICATIONS

Office Action dated Feb. 13, 2023 in counterpart Chinese Application No. 202010091903.0, together with English translation thereof.

(Continued)

*Primary Examiner* — Jeremy R Severson

(74) *Attorney, Agent, or Firm* — Venable LLP

(57) ABSTRACT

A pull-in apparatus configured to pull in a unit toward a predetermined position in an apparatus body includes an arm member, a restriction member, a first action portion and a second action portion. The restriction member is movable between a lock position at which the restriction member restricts movement of the arm member in a first direction and a lock-release position at which the restriction member allows the movement of the arm member in the first direction. Movement of the restriction member from the lock position toward the lock-release position is restricted in a state in which the arm member is at a stand-by position, and is allowed in a state in which the arm member has been moved from the stand-by position in a second direction.

17 Claims, 26 Drawing Sheets

(56) References Cited

U.S. PATENT DOCUMENTS

| | | | | |
|---|---|---|---|---|
| 8,408,535 | B2 | 4/2013 | Miki | B65H 1/00 |
| 8,532,557 | B2 | 9/2013 | Kusumi et al. | G03G 15/00 |
| 9,046,871 | B2 | 6/2015 | Suzuki et al. | G03G 21/18 |
| 9,291,993 | B2 | 3/2016 | Sawashima | G03G 15/00 |
| 2006/0180996 | A1 | 8/2006 | Iwase et al. | B65H 1/00 |
| 2008/0117482 | A1 | 5/2008 | Kusumi | H04N 1/04 |
| 2008/0180764 | A1 | 7/2008 | Wakiyama et al. | H04N 1/04 |
| 2008/0181658 | A1 | 7/2008 | Okabe | G03G 21/16 |
| 2010/0007081 | A1 | 1/2010 | Miki | B65H 5/00 |
| 2011/0031681 | A1 | 2/2011 | Miki | B65H 1/00 |
| 2013/0243481 | A1 | 9/2013 | Toba et al. | G03G 21/18 |
| 2016/0289015 | A1 | 10/2016 | Iwama | B65H 1/26 |
| 2020/0264554 | A1 | 8/2020 | Sawashima et al. | G03G 21/16 |

FOREIGN PATENT DOCUMENTS

| | | |
|---|---|---|
| CN | 101715570 | 5/2010 |
| CN | 101992957 | 3/2011 |
| EP | 2144121 | 1/2010 |
| EP | 2281764 | 2/2011 |
| JP | 2008-254841 | 10/2008 |
| JP | 2011-037540 | 2/2011 |
| JP | 2015-124048 | 7/2015 |
| JP | 2016-193769 | 11/2016 |
| JP | 2017-149502 | 8/2017 |

OTHER PUBLICATIONS

Extended European search report dated Oct. 9, 2020 in counterpart EP Application No. 20153559.8.

* cited by examiner

PULL-IN APPARATUS, IMAGE FORMING APPARATUS, SHEET ACCOMMODATING APPARATUS, AND DRAW-OUT UNIT

This application is a continuation of application Ser. No. 16/776,897 filed Jan. 30, 2020, currently pending; and claims priority under 35 U.S.C. § 119 to Japan Application No. 2019-027867 filed in Japan on Feb. 19, 2019; and the contents of all of which are incorporated herein by reference as if set forth in full.

BACKGROUND OF THE INVENTION

Field of the Invention

The present invention relates to a pull-in apparatus that pulls in a unit, an image forming apparatus that forms an image on a sheet, a sheet accommodating apparatus that accommodates a sheet, and a draw-out unit.

Description of the Related Art

Some of image forming apparatuses such as printers, copiers, and multifunctional apparatuses include a pull-in apparatus that pulls in a unit (i.e., draw-out unit) drawable from an apparatus body to a predetermined position in the apparatus body. For example, in an image forming apparatus of an electrophotographic system, a pull-in apparatus is used for pulling a tray supporting a process cartridge into an apparatus body or for pulling a cassette accommodating a sheet used as a recording medium into the apparatus body.

Japanese Patent Laid-Open No. 2011-037540 discloses a pull-in apparatus that pulls a feeding cassette into a printer body and includes a lever member urged by a spring and a locking claw that is supported by the lever member and engages with the feeding cassette. According to this document, when a projection provided on the feeding cassette engages with the locking claw in accordance with insertion of the feeding cassette, locking of the lever member is released, and the lever member is pivoted by the urging force of the spring to pull in the feeding cassette.

In the pull-in apparatus described in the document above, in a state in which the feeding cassette has been drawn out, the locking claw is engaged with a fixed member and the lever member is locked in an unpivotable state. However, in this configuration, there is a possibility that, in a case where, for example, a user erroneously touches the locking claw, the locking of the locking claw is unintentionally released and the lever member pivots to a position of a pulled-in state even though the feeding cassette is not inserted. In Japanese Patent Laid-Open No. 2011-037540, a procedure for recovering the lever member that has pivoted to the position of the pulled-in state to a normal state is provided. However, this also has disadvantages such as degradation of usability caused by requiring the user to perform irregular operation and increase in the cost caused by providing a structure for the recovery.

SUMMARY OF THE INVENTION

The present invention provides a pull-in apparatus, an image forming apparatus, a sheet accommodating apparatus and a draw-out unit capable of suppressing erroneous release of locking.

According to one aspect of the invention, a pull-in apparatus is configured to pull in a unit, which is drawable from an apparatus body of an image forming apparatus, toward a predetermined position in the apparatus body. The pull-in apparatus includes: an arm member that is provided in one of the apparatus body and the unit and is configured to move the unit toward the predetermined position by moving in a first direction; a restriction member that is provided in the one of the apparatus body and the unit and is movable with respect to the arm member, in a state of being supported by the arm member, between a lock position at which the restriction member restricts movement of the arm member in the first direction and a lock-release position at which the restriction member allows the movement of the arm member in the first direction; a first action portion that is provided in another of the apparatus body and the unit and is configured to move the arm member positioned at a stand-by position in a second direction opposite to the first direction in a course of inserting the unit in the apparatus body; and a second action portion that is provided in the other of the apparatus body and the unit and is configured to move the restriction member from the lock position to the lock-release position in the course of inserting the unit in the apparatus body, wherein movement of the restriction member from the lock position toward the lock-release position is restricted in a state in which the arm member is at the stand-by position, and the movement of the restriction member from the lock position toward the lock-release position is allowed in a state in which the arm member has been moved from the stand-by position in the second direction.

According to another aspect of the invention, a draw-out unit is configured to be drawn out of an apparatus body of an image forming apparatus, wherein the apparatus body includes: an arm member configured to move the draw-out unit toward a predetermined position in the apparatus body by moving in a first direction; and a restriction member that is movable with respect to the arm member, in a state of being supported by the arm member, between a lock position at which movement of the arm member in the first direction is restricted and a lock-release position at which the movement of the arm member in the first direction is allowed. The draw-out unit includes: a first action portion configured to move the arm member positioned at a stand-by position in a second direction opposite to the first direction in a course of inserting the draw-out unit in the apparatus body; and a second action portion configured to move the restriction member from the lock position to the lock-release position in the course of inserting the unit in the apparatus body, wherein movement of the restriction member from the lock position toward the lock-release position is restricted in a state in which the arm member is at the stand-by position, and the movement of the restriction member from the lock position toward the lock-release position is allowed in a state in which the arm member has been moved from the stand-by position in the second direction.

Further features of the present invention will become apparent from the following description of exemplary embodiments with reference to the attached drawings.

DESCRIPTION OF THE EMBODIMENTS

First Exemplary Embodiment

Overall Configuration

Figure 1:
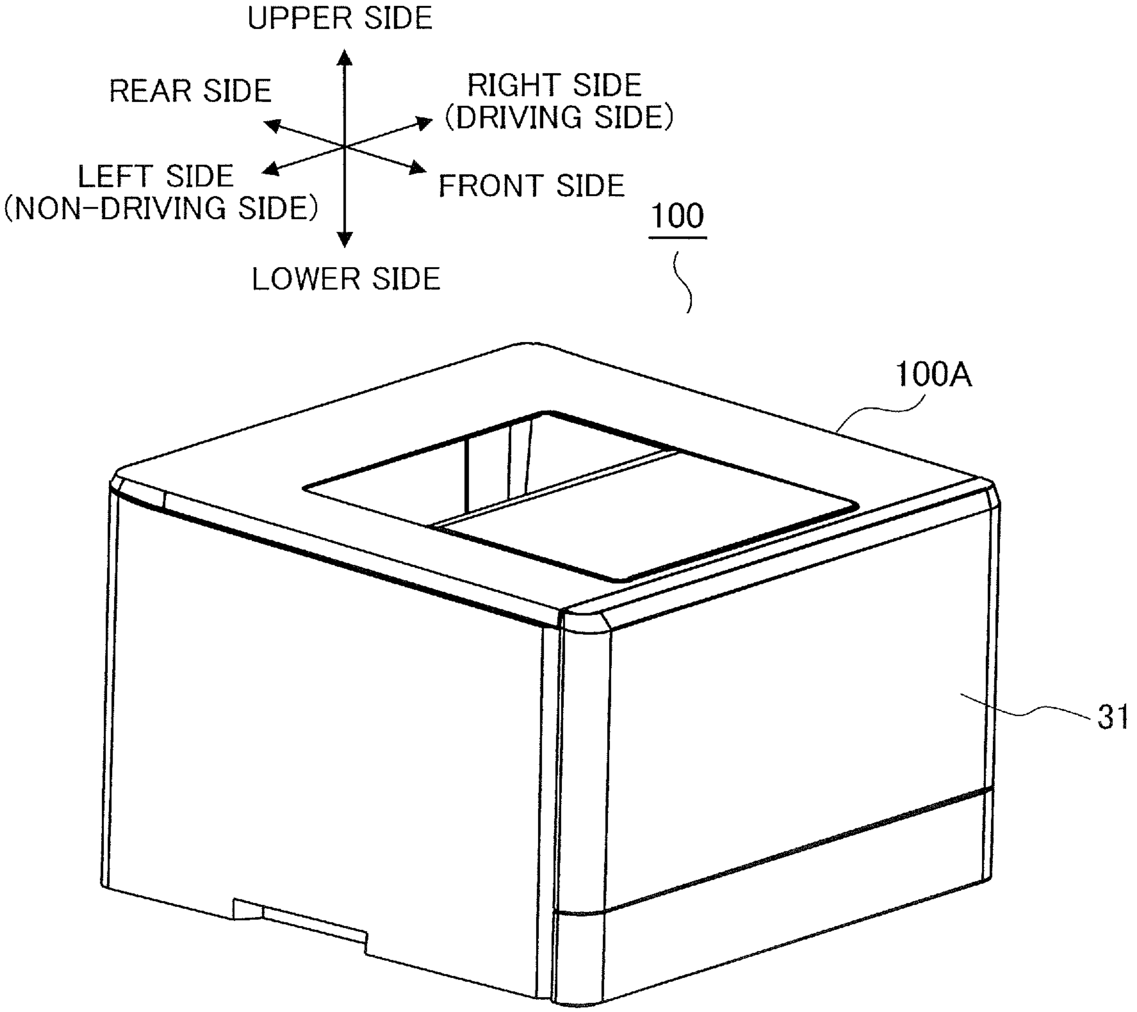
FIG. 1 is an overall perspective view of a printer.

First, a printer 100 serving as an image forming apparatus according to a first exemplary embodiment is a full-color laser beam printer of an electrophotographic system. As illustrated in FIG. 1, the printer 100 includes an apparatus body 100A and a front door 31 supported to be openable and closeable with respect to the apparatus body 100A. To be noted, for description of the printer 100, directions are defined as follows. That is, the side of the printer 100 on which the front door 31 is provided will be referred to as the front side, the opposite side thereto will be referred to as the rear side, and a direction from the rear side toward the front side or from the front side toward the rear side will be referred to as a front-rear direction.

In addition, the left side, the right side, the upper side, and the lower side are defined with a state in which the printer 100 is viewed from the front side as a standard. The left side and the right side will be also respectively referred to as the non-driving side and the driving side. Further, a direction from the right side toward the left side or from the left side toward the right side will be referred to as a left-right direction, and a direction from the upper side toward the lower side or from the lower side toward the upper side will be referred to as an up-down direction.

Figure 2:
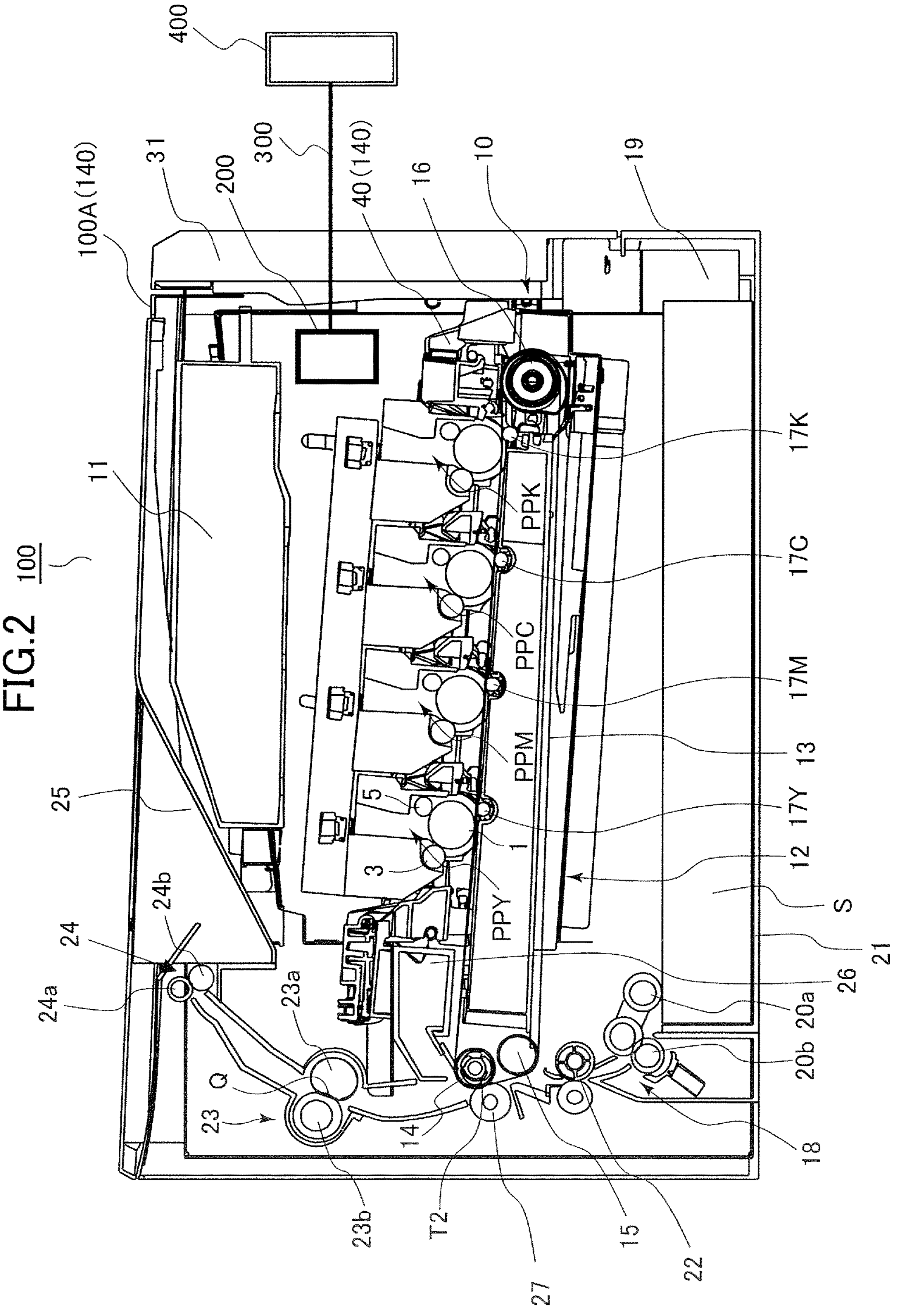
FIG. 2 is an overall schematic view of the printer illustrating an inner configuration thereof.

As illustrated in FIG. 2, the printer 100 includes an image forming unit 10 that forms an image on a sheet S, a sheet feeding portion 18, a fixing unit 23, a discharge roller pair 24, and a controller 200. The printer 100 is capable of forming a full-color image or a monochromatic image on a sheet-shaped recording medium, which will be hereinafter referred to as a sheet S, on the basis of an electric image signal output from an external host apparatus 400 and input to the controller 200 via an interface portion 300. The external host apparatus 400 is, for example, a personal computer, an image reader, or a facsimile machine.

The controller 200 controls an electrophotographic image formation process of the printer 100, and communicates various electric information with the external host apparatus 400. In addition, the controller 200 performs processing of electric information input from various process devices and sensors, processing of command signals to the various process devices, predetermined initial sequence control, sequence control of a predetermined image formation process, and so forth.

The sheet feeding portion 18 is provided in a lower portion of the printer 100, and includes a cassette 19 that accommodates the sheet S, an inner plate 21 that supports the sheet S and is capable of ascending and descending, a pickup roller 20*a*, and a separation roller pair 20*b*. The cassette 19 is formed to be capable of being drawn out to the front side from the apparatus body 100A and being attached to the apparatus body 100A from the front side. The sheet S supported on the inner plate 21 is fed by the pickup roller 20*a*. When a plurality of sheets S are fed at once, one sheet S is separated and fed by the separation roller pair 20*b*. To be noted, a torque limiter system or a retard roller system may be applied to the separation roller pair 20*b*, and a separation pad may be used instead of one of the separation roller pair 20*b*.

The fixing unit 23 includes a fixing film 23*a* configured to be heated by a heater, and a pressurizing roller 23*b* that is in pressure contact with the fixing film 23*a*, and a fixing nip Q is formed by the fixing film 23*a* and the pressurizing roller 23*b*. The discharge roller pair 24 includes a discharge driving roller 24*a* and a discharge driven roller 24*b* that is rotationally driven in accordance with the discharge driving roller 24*a*.

The image forming unit 10 serving as an image forming portion includes a cartridge tray 40, four process cartridges PPY, PPM, PPC, and PPK, a scanner unit 11, a transfer unit 12, and a cleaning unit 26. The process cartridges PPY, PPM, PPC, and PPK will be also collectively referred to as process cartridges PP. The transfer unit 12 includes a driving roller 14, an auxiliary roller 15, a tension roller 16, and an intermediate transfer belt 13. The intermediate transfer belt 13 is stretched over the driving roller 14, the auxiliary roller 15, and the tension roller 16, is formed from a dielectric material, and is flexible.

Primary transfer rollers 17Y, 17M, 17C, and 17K respectively opposing photosensitive drums of the process cartridges PPY, PPM, PPC, and PPK are provided in a space enclosed by the intermediate transfer belt 13. A secondary transfer roller 27 is provided opposite to the driving roller 14 with the intermediate transfer belt 13 interposed therebetween. A secondary transfer nip T2 is formed by the intermediate transfer belt 13 and the secondary transfer roller 27.

The four process cartridges PPY, PPM, PPC, and PPK respectively form toner images of four colors of yellow, magenta, cyan, and black. Y, M, C, and K respectively represent yellow, magenta, cyan, and black. To be noted, the four process cartridges PPY, PPM, PPC, and PPK have the same configuration except for the image to be formed. Therefore, only the configuration and image formation process of the process cartridge PPY will be described, and description of the process cartridges PPM, PPC, and PPK will be omitted.

Figure 3A:
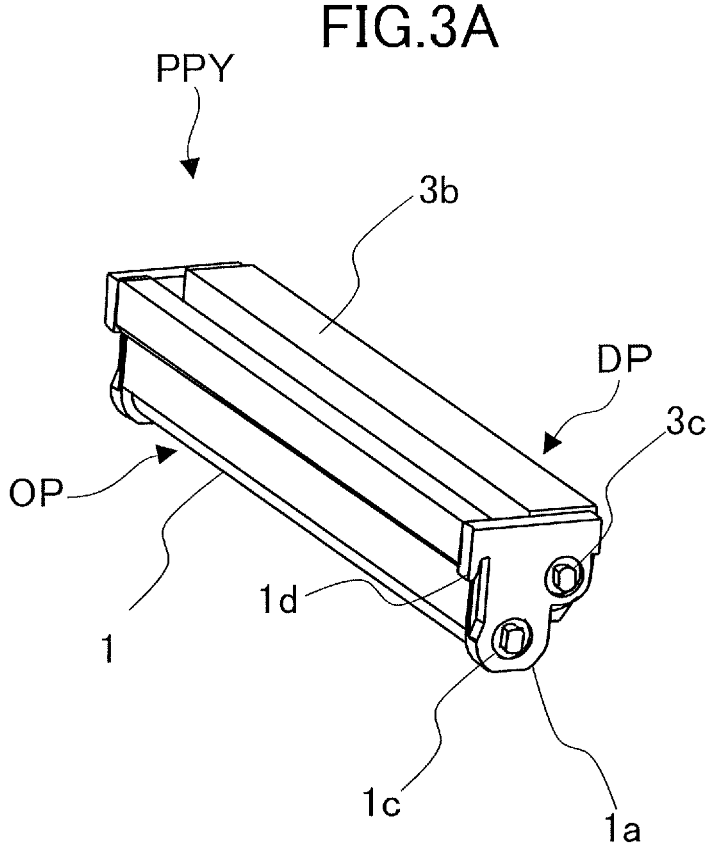
FIG. 3A is a front perspective view of a process cartridge.
Figure 3B:
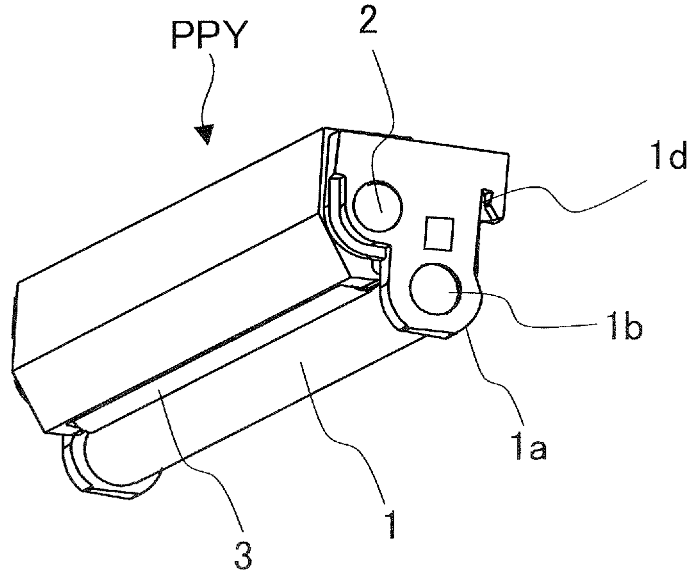
FIG. 3B is a rear perspective view of the process cartridge.

As illustrated in FIGS. 2 to 3B, the process cartridge PPY is a unit in which a drum unit OP and a developing unit DP are integrated. The drum unit OP includes a photosensitive drum 1 serving as an image bearing member capable of bearing a toner image. The developing unit DP includes a developing roller 3 that develops a latent image formed on the photosensitive drum 1 into a toner image, and an accommodating portion 3*b* that accommodates a developer. A drum coupling 1*c* and a developing coupling 3*c* are respectively provided on the driving side, that is, the right side of the photosensitive drum 1 and the developing roller 3 in the longitudinal direction, and drive is transmitted thereto from an unillustrated drive source of the apparatus body 100A. In addition, a contact 2 is provided on the non-driving side, that is, the left side of the developing roller 3 in the longitudinal direction, and a developing bias is applied to the contact 2 in contact with a contact 38 provided in the apparatus body 100A as illustrated in FIG. 12B. A contact 1*b* for connecting to the ground potential is provided on the non-driving side of the photosensitive drum 1 in the longitudinal direction.

The process cartridges PPY, PPM, PPC, and PPK are held by the cartridge tray 40, and a user can access the cartridge tray 40 by opening the front door 31. Further, the user can replace the process cartridges PPY, PPM, PPC, and PPK by drawing out the cartridge tray 40 to the front side.

Image Forming Operation

Next, an image forming operation of the printer 100 configured in this manner will be described. When the controller 200 of the printer 100 receives a job signal from the interface portion 300, an unillustrated developing separation mechanism provided in the apparatus body 100A moves in the front-rear direction. The developing separation mechanism causes the developing roller 3 to abut the photosensitive drum 1.

To be noted, in a job in which a monochromatic image is formed, only the photosensitive drum of the process cartridge PPK abuts the developing roller, and in a job in which a full-color image is formed, the photosensitive drums of the process cartridges PPY, PPM, PPC, and PPK abut respective developing rollers. Then, the photosensitive drums, the developing rollers, and the intermediate transfer belt 13 are driven by an unillustrated drive source.

The scanner unit 11 radiates laser light corresponding to an image signal onto the photosensitive drum 1 of the process cartridge PPY. In this case, the surface of the photosensitive drum 1 is uniformly charged to a predetermined polarity and predetermined potential in advance by a charging roller 5, and an electrostatic latent image is formed thereon as a result of being irradiated by the laser light from the scanner unit 11. The electrostatic latent image formed on the photosensitive drum 1 is developed by the developing roller 3, and thus a yellow toner image is formed on the photosensitive drum 1.

Figure 5A:
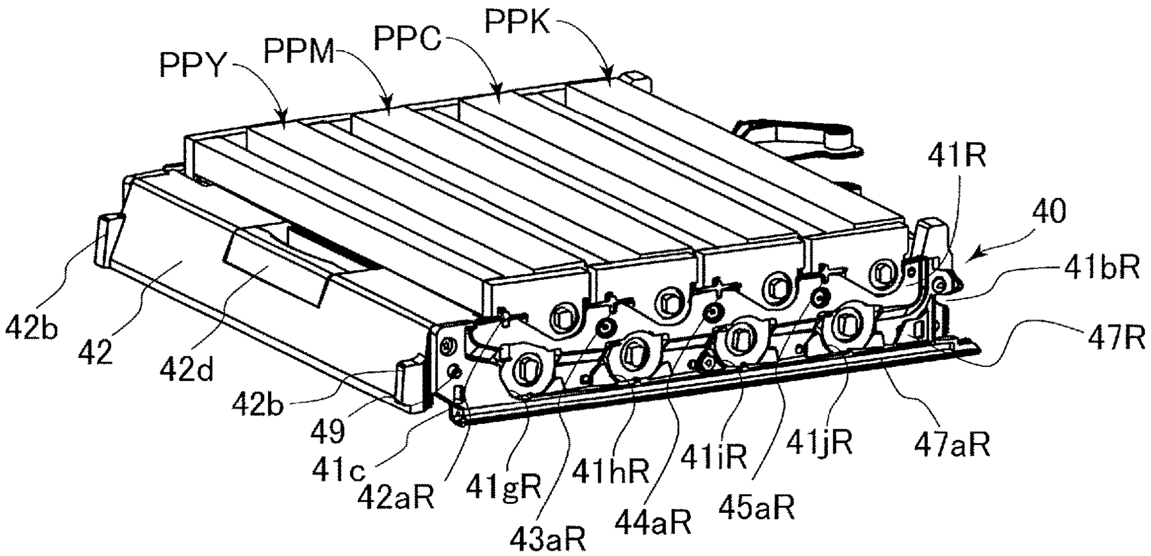
FIG. 5A is a front perspective view of the cartridge tray with respective process cartridges attached thereto.
Figure 5B:
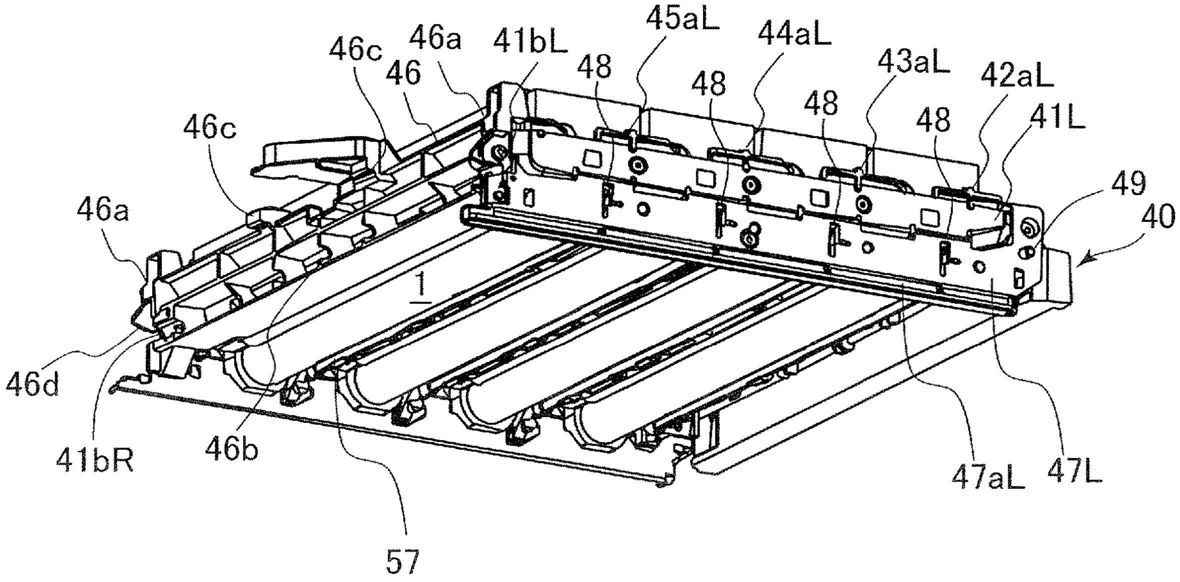
FIG. 5B is a rear perspective view of the cartridge tray with the respective process cartridges attached thereto.

To be noted, a light guide 57 illustrated in FIG. 5B serving as a pre-exposing portion is provided in the cartridge tray 40. The light guide 57 is formed from, for example, transparent acrylic resin or the like. Before charging the surface of the photosensitive drum 1 by the charging roller 5, light is emitted from an unillustrated light source, and is radiated onto the surface of the photosensitive drum 1 in a state of being uniformly diffused in the longitudinal direction by the light guide 57. As a result of this, the potential of the surface of the photosensitive drum 1 is stabilized, and thus a good toner image can be formed.

Similarly, the laser light is also radiated onto the photosensitive drums of the process cartridges PPM, PPC, and PPK from the scanner unit 11, and toner images of magenta, cyan, and black are formed on the respective photosensitive drums. The toner images of respective colors formed on the respective photosensitive drums are transferred onto the intermediate transfer belt 13 by primary transfer bias applied to the primary transfer rollers 17Y, 17M, 17C, and 17K. The full-color toner image transferred onto the intermediate transfer belt 13 is conveyed to the secondary transfer nip T2 by the intermediate transfer belt 13 rotated by the driving roller 14. To be noted, the image formation process of each color is performed at such a timing that each toner image is superimposed on an upstream toner image that has been already transferred onto the intermediate transfer belt 13 through primary transfer.

The skew of the sheet S fed out by the sheet feeding portion 18 is corrected by the registration roller pair 22 in parallel with this image formation process. Further, the registration roller pair 22 conveys the sheet S toward the secondary transfer roller 27 at a timing matching conveyance of the toner image on the intermediate transfer belt 13. The full-color toner image on the intermediate transfer belt 13 is transferred onto the sheet S at the secondary transfer nip T2 by a secondary transfer bias applied to the secondary transfer roller 27. In addition, after the transfer of the toner image, toner remaining on the surface of the intermediate transfer belt 13 is removed by the cleaning unit 26, and is collected into an unillustrated waste toner collection container.

The sheet S onto which the toner image has been transferred is subjected to predetermined heat and pressure in the fixing nip Q of the fixing unit 23, thus the toner melts and then adheres to the sheet S, and thereby an image is fixed to the sheet S. The sheet S having passed through the fixing unit 23 is discharged onto a discharge tray 25 by the discharge roller pair 24.

Cartridge Tray

Figure 4A:
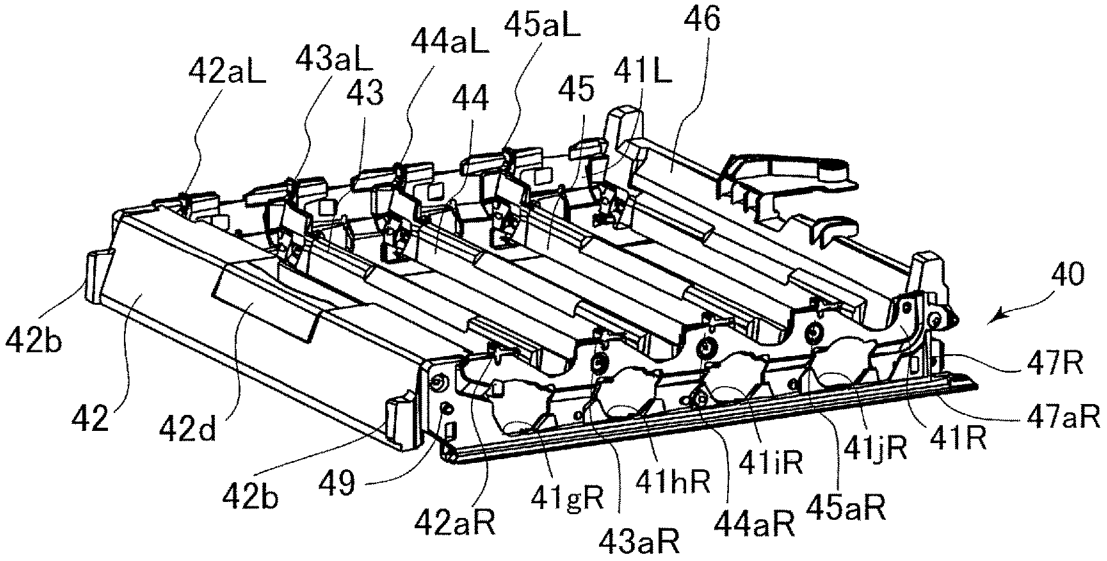
FIG. 4A is a front perspective view of a cartridge tray.
Figure 4B:
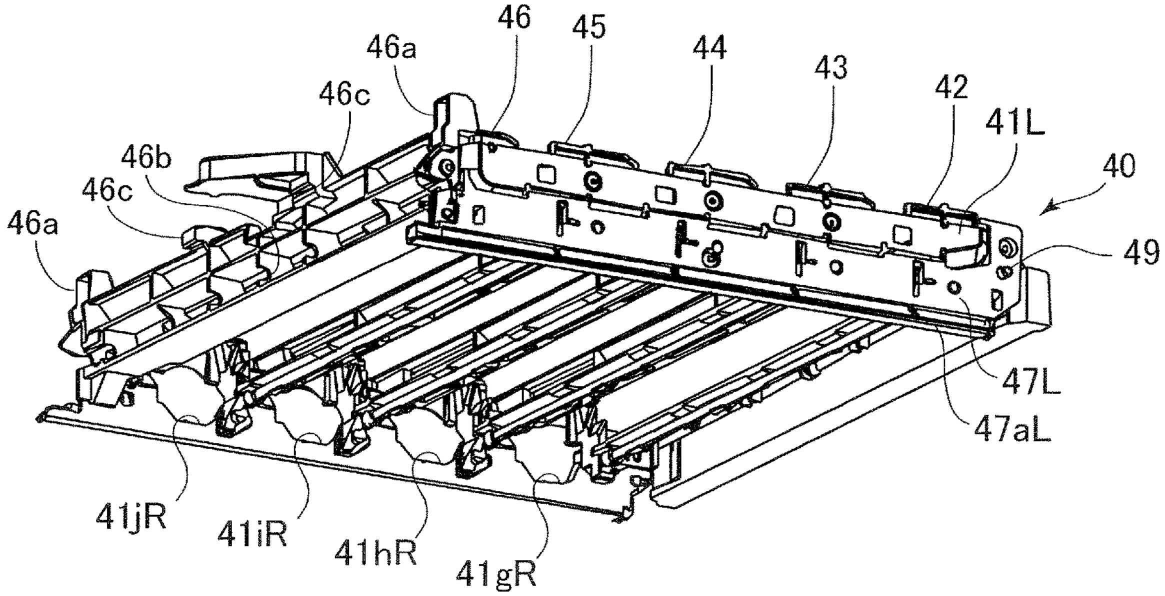
FIG. 4B is a rear perspective view of the cartridge tray.

Next, a configuration of the cartridge tray 40 will be described. As illustrated in FIGS. 4A and 4B, the cartridge tray 40 includes a tray side plates 41L and 41R arranged in the left-right direction with an interval therebetween, coupling members 42, 43, 44, 45, and 46 that couple the tray side plates 41L and 41R to each other, and guide members 47L and 47R. To be noted, in the description below, a pair of members respectively provided on the left side and the right side will be distinguished by adding "L" or "R" to the end of the reference sign.

The coupling members 42 to 46 are formed from a resin material, and are arranged in this order from the front side to the rear side. The light guide 57 described above is provided on each of the coupling members 42 to 45. The tray side plates 41L and 41R are formed from a metal material, the guide member 47L is supported by the tray side plate 41L, and the guide member 47R is supported by the tray side plate 41R. The guide members 47L and 47R are respectively slidable on a plurality of rollers 56L and 56R respectively provided on holders 52L and 52R illustrated in FIGS. 11A to 12B. Further, guide grooves 47*a*L and 47*a*R are respectively defined in the guide members 47L and 47R, and guide the cartridge tray 40 in a draw-out direction and in the attachment direction with respect to the apparatus body 100A. In addition, the guide grooves 47*a*L and 47*a*R engage with unillustrated stoppers provided in the apparatus body 100A to restrict drawing out of the cartridge tray 40 beyond a predetermined position.

The coupling member 42 includes receiving portions 42*b* and a grip portion 42*d*, and the user can draw out the cartridge tray 40 from the apparatus body 100A by gripping the grip portion 42*d*. In addition, when an impact toward the front side is applied to the printer 100 in a state in which the front door 31 is closed, the receiving portions 42*b* abut the front door 31 and thus suppress damage to components inside the printer 100. Similarly, the coupling member 46 include receiving portions 46*a*, and, when an impact toward the rear side is applied to the printer 100, the receiving portions 46*a* abut a fixing stay 35 illustrated in FIG. 6 and thus suppress damage to the components inside the printer 100.

The tray side plates 41L and 41R have shapes in which the upper portions thereof extend further to the outside than the lower portions thereof, and the distance between the tray side plates 41L and 41R in the left-right direction is smaller in the upper portion than in the lower portion. As a result of this, the width of the cartridge tray 40 in the left-right direction can be reduced without degrading the insertability/ejectability of the process cartridges PPY, PPM, PPC, and PPK, which contributes miniaturization of the printer 100.

Further, the lower side of the tray side plates 41L and 41R are bent into L shapes to secure the strength. Although the tray side plates 41L and 41R and the coupling members 42 to 46 are each fastened by screws, the configuration is not limited to this, and thermal caulking or the like may be used. In addition, a configuration in which only the coupling members 42 and 46 are fastened to the tray side plates 41L and 41R and the coupling members 43 to 45 are not fastened to the tray side plates 41L and 41R may be employed.

As illustrated in FIGS. 4A to 5B, cartridge engagement portions 41*g*R, 41*h*R, 41*i*R, and 41*j*R are provided in the tray side plate 41R, and the cartridge engagement portions 41*g*R, 41*h*R, 41*i*R, and 41*j*R are each formed in an approximately V shape. Specifically, the cartridge engagement portions 41*g*R, 41*h*R, 41*i*R, and 41*j*R are each formed such that an inclined surface thereof on the front side in the draw-out direction has an angle of 65° and an inclined surface thereof on the rear side has an angle of 45°.

Drum flanges 1*a* of the process cartridges PPY, PPM, PPC, and PPK illustrated in FIG. 3A respectively engage with the cartridge engagement portions 41*g*R, 41*h*R, 41*i*R, and 41*j*R. As a result of this, the process cartridges PPY, PPM, PPC, and PPK are positioned with respect to the cartridge tray 40 by the weight thereof or by being pressed downward by pressing units 33 and 34 illustrated in FIG. 11A. The pressing units 33 and 34 press the process cartridges downward at the time of image formation, and thus the process cartridges and the cartridge tray 40 integrated with the process cartridges are positioned with respect to the apparatus body 100A. To be noted, unillustrated cartridge engagement portions are similarly formed in the tray side plate 41L, and the process cartridges PPY, PPM, PPC, and PPK are also positioned with respect to the tray side plate 41L.

In addition, boss portions 42*a*L, 43*a*L, 44*a*L, and 45*a*L are respectively formed on left end portions of the coupling members 42, 43, 44, and 45, and boss portions 42*a*R, 43*a*R, 44*a*R, and 45*a*R are respectively formed on right end portions of the coupling members 42, 43, 44, and 45. To be noted, the groove portions 1*d* are defined in left and right end portions of the process cartridge of each color as illustrated in FIGS. 3A and 3B. Further, the groove portions 1*d* of the process cartridges PPY, PPM, PPC, and PPK respectively engage with the boss portions 42*a*L, 43*a*L, 44*a*L, and 45*a*L on the left end side and with the boss portions 42*a*R, 43*a*R, 44*a*R, and 45*a*R on the right end side. As a result of this, rotation of the process cartridges PPY, PPM, PPC, and PPK with respect to the cartridge tray 40 is restricted.

In this manner, the process cartridges PPY, PPM, PPC, and PPK are mounted on the cartridge tray 40, and are grounded via a wire material 48 serving as a drum ground wire provided in the guide member 47L.

Positioning Configuration of Cartridge Tray

Figure 6:
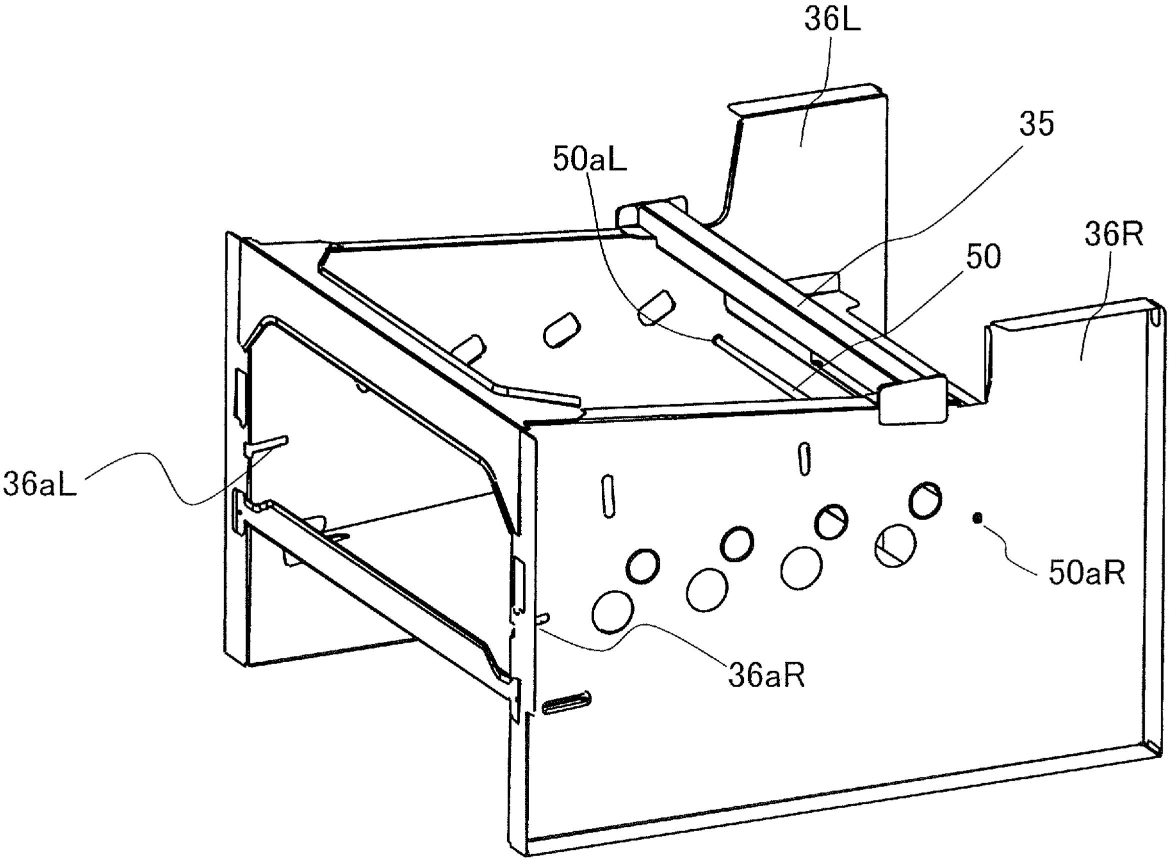
FIG. 6 is a perspective view of a frame structure of a printer body.

Next, a positioning configuration of the cartridge tray 40 will be described. As illustrated in FIG. 6, the apparatus body 100A illustrated in FIG. 1 includes a pair of body side plates 36L and 36R respectively on the left side and the right side, and the fixing stay 35 that couples the body side plates 36L and 36R to each other and define a process region and a fixing region. The process region is a region where the process cartridges PPY, PPM, PPC, and PPK are accommodated, and the fixing region is a region where the fixing unit 23 is accommodated. The body side plates 36L and 36R and the fixing stay 35 are formed from a metal material.

The body side plates 36L and 36R respectively include shaft support portions 50aL and 50aR on the rear side of the apparatus, and the shaft support portions 50aL and 50aR support a positioning shaft 50. To be noted, although the positioning shaft 50 is fixed so as to be immobile with respect to the shaft support portions 50aL and 50aR, the positioning shaft 50 may be rotatably supported as long as the positioning shaft 50 is immobile in the front-rear direction and in the up-down direction.

Figure 7:
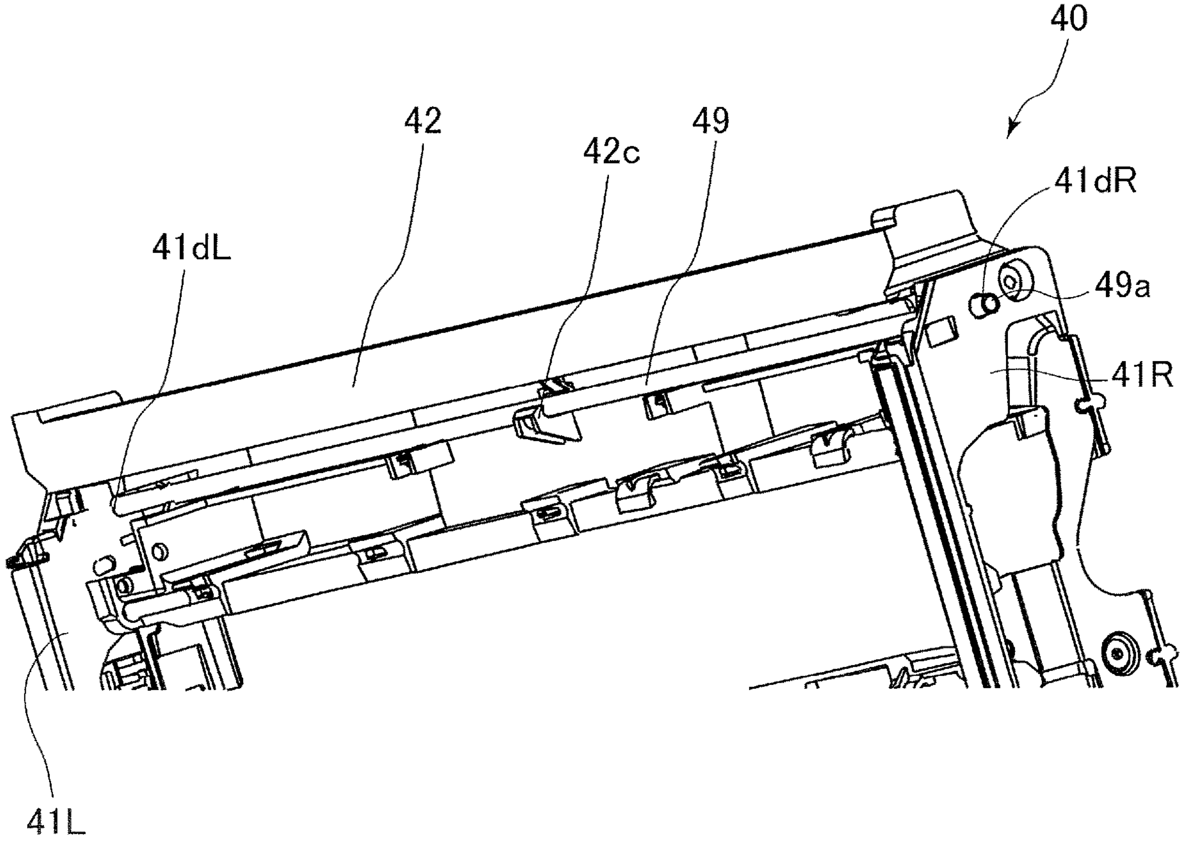
FIG. 7 is a bottom perspective view of a positioning shaft of the cartridge tray.

In addition, the body side plates 36L and 36R respectively have positioning grooves 36aL and 36aR on the apparatus front side. The positioning grooves 36aL and 36aR will be also collectively referred to as a body positioning portion 36a. As illustrated in FIG. 7, shaft support portions 41dL and 41dR are respectively formed on the front side of the tray side plates 41L and 41R of the cartridge tray 40. The shaft support portions 41dL and 41dR support a positioning shaft 49. The positioning shaft 49 penetrates through the tray side plates 41L and 41R, and an unillustrated left end portion and a right end portion 49a of the positioning shaft 49 project to the outside from the tray side plates 41L and 41R. To be noted, although the positioning shaft 49 is fixed so as to be immobile with respect to the shaft support portions 41dL and 41dR, the positioning shaft 49 may be rotatably supported as long as the positioning shaft 49 is immobile in the front-rear direction and in the up-down direction. In addition, although the positioning shafts 49 and 50 are formed as round rod shafts that extend in the left-right direction and have circular shapes in a section view, the shapes thereof are not limited.

Further, a shaft contact portion 42c that supports an approximate center portion of the positioning shaft 49 in the axial direction thereof from below is formed on the coupling member 42, and the shaft contact portion 42c regulates downward warpage of the positioning shaft 49. To be noted, the shaft contact portion 42c may support a different position of the positioning shaft 49 from below instead of the approximate center portion of the positioning shaft 49 in the axial direction. However, it is preferable to regulate the downward warpage of the positioning shaft 49 at the center portion of the positioning shaft 49. In addition, the shaft contact portion 42c may be formed in a shape elongated in the axial direction.

Figure 8A:
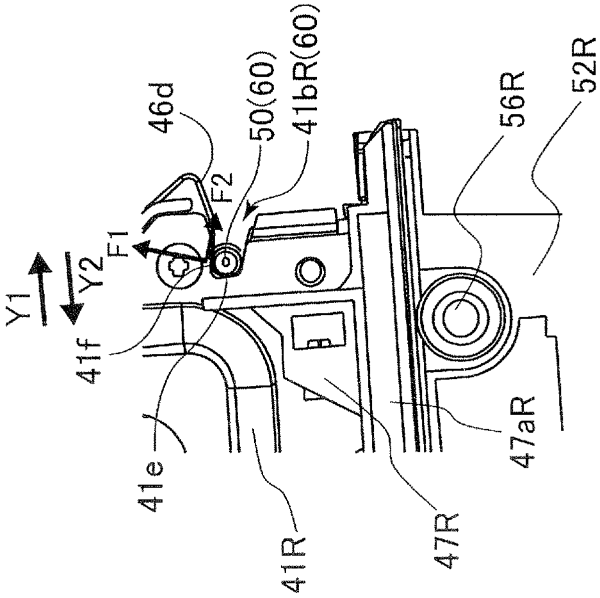
FIG. 8A is a section view of the printer illustrating a state in which a positioning shaft on the apparatus body side is engaged with a positioning groove.
Figure 8B:
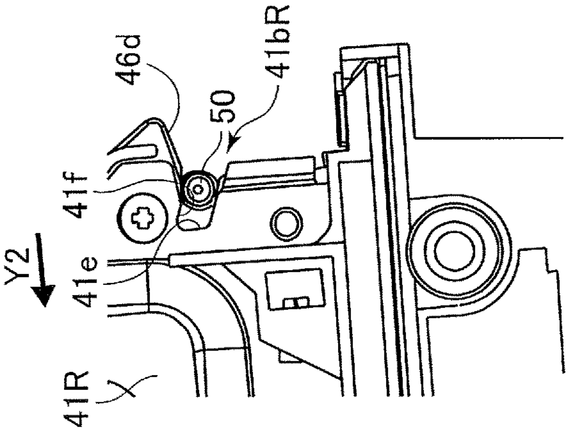
FIG. 8B is a section view of the printer illustrating the positioning shaft and the positioning groove in a state in which the cartridge tray is slightly drawn out from an attached state.
Figure 8C:
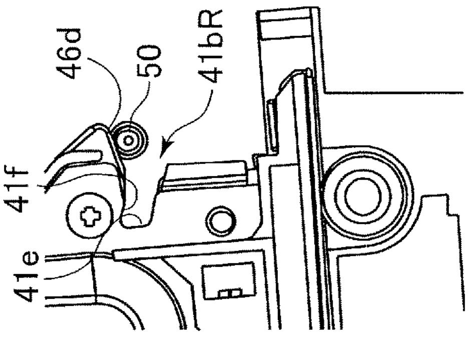
FIG. 8C is a section view of the printer illustrating the positioning shaft and the positioning groove in a state in which the cartridge tray is further drawn out from the state of FIG. 8B.
Figure 8D:
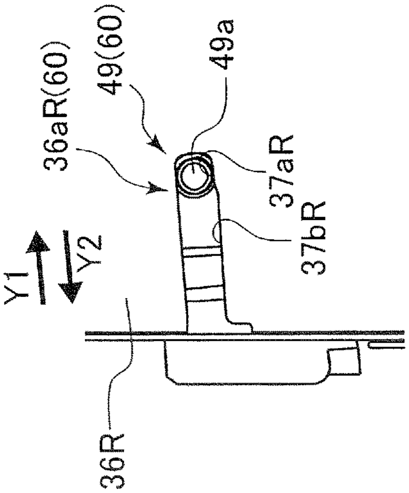
FIG. 8D is a section view of the printer illustrating a state in which a positioning shaft on the cartridge tray side is engaged with a positioning groove.

As illustrated in FIG. 8D, the positioning groove 36aR in the body side plate 36R is defined along an attachment direction Y1 of the cartridge tray 40, and includes a fitting groove 37aR defined on the rear side and a guide groove 37bR defined on the front side.

The fitting groove 37aR has a width equal to or slightly smaller than the outer diameter of the positioning shaft 49, and the end portion 49a of the positioning shaft 49 fits in the fitting groove 37aR when the cartridge tray 40 is positioned at an attached position. The guide groove 37bR has a width larger than the outer diameter of the positioning shaft 49, and guides the end portion 49a of the positioning shaft 49 to the fitting groove 37aR when attaching the cartridge tray 40 to the apparatus body 100A. To be noted, the guide groove and the fitting groove are also similarly defined in the body side plate 36L, and guide or engage with a left end portion of the positioning shaft 49.

As illustrated in FIG. 5B, positioning grooves 41bL and 41bR are respectively defined on the rear side of the tray side plates 41L and 41R. The positioning grooves 41bL and 41bR engage with the positioning shaft 49 to position the cartridge tray 40. The positioning grooves 41bL and 41bR will be also collectively referred to as a tray positioning portion 41b. FIGS. 8A to 8C are enlarged views of the positioning groove 41bL. To be noted, the positioning grooves 41bL and 41bR have similar configurations, and therefore only the positioning groove 41bR will be described and description of the positioning groove 41bL will be omitted.

As illustrated in FIGS. 8A to 8C, the positioning groove 41bR serving as a first engaged portion includes an inclined surface 41f and a positioning surface 41e formed continuously from the inclined surface 41f. The positioning surface 41e extends in a direction approximately perpendicular to the attachment direction Y1 of the cartridge tray 40, and positions the cartridge tray 40 in the attachment direction by abutting the positioning shaft 50. The inclined surface 41f is inclined downward toward the downstream side in the attachment direction Y1. In addition, a sliding surface 46d illustrated in FIG. 5B is formed on the coupling member 46 of the cartridge tray 40 such that the sliding surface 46d is continuous to the front side from the inclined surface 41f.

Figure 11A:
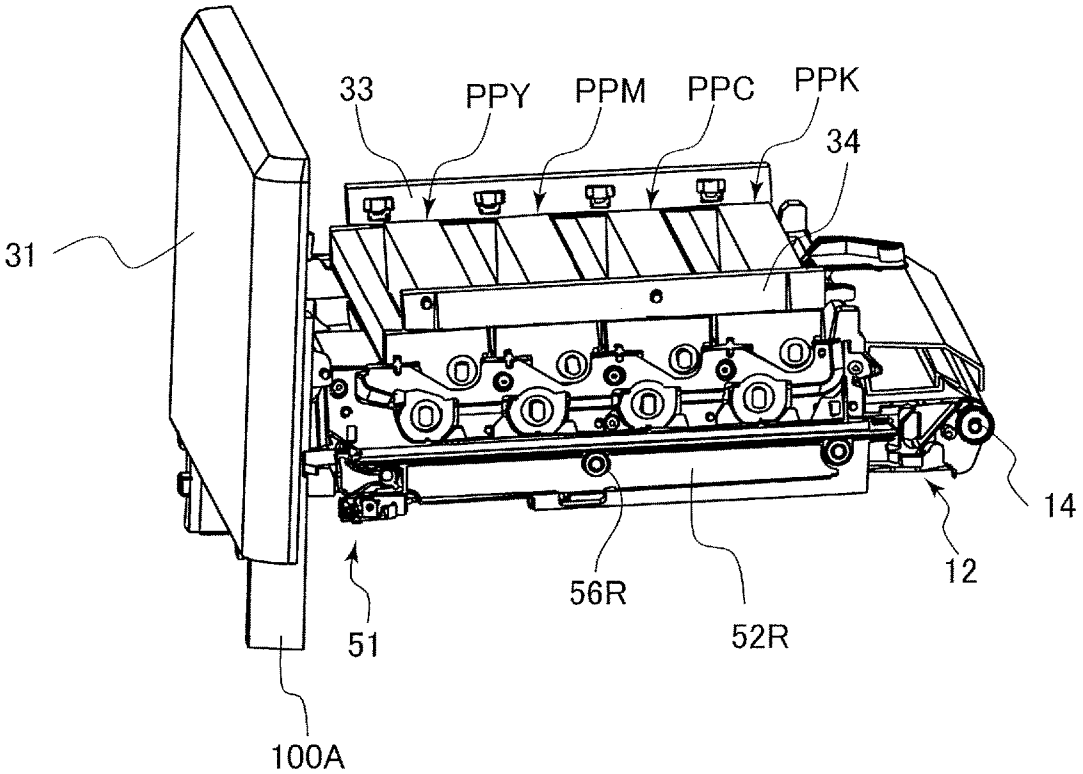
FIG. 11A is a front perspective view of the process cartridges and the cartridge tray in a state in which a front door is closed.

As illustrated in FIG. 8A, when the cartridge tray 40 is attached, a downward force is applied to the cartridge tray 40 by the weight thereof and by the pressing units 33 and 34 illustrated in FIG. 11A, and thus the inclined surface 41f receives a reaction force F1 from the positioning shaft 50. Since the reaction force F1 includes a component force F2 in the attachment direction Y1, the cartridge tray 40 is pulled in the attachment direction Y1 by the component force F2. As a result of this, the positioning surface 41e is pressed against the positioning shaft 50, and thus the cartridge tray 40 can be precisely positioned with respect to the apparatus body 100A. As described above, the inclined surface 41f is formed to generate the component force F2.

Figure 9:
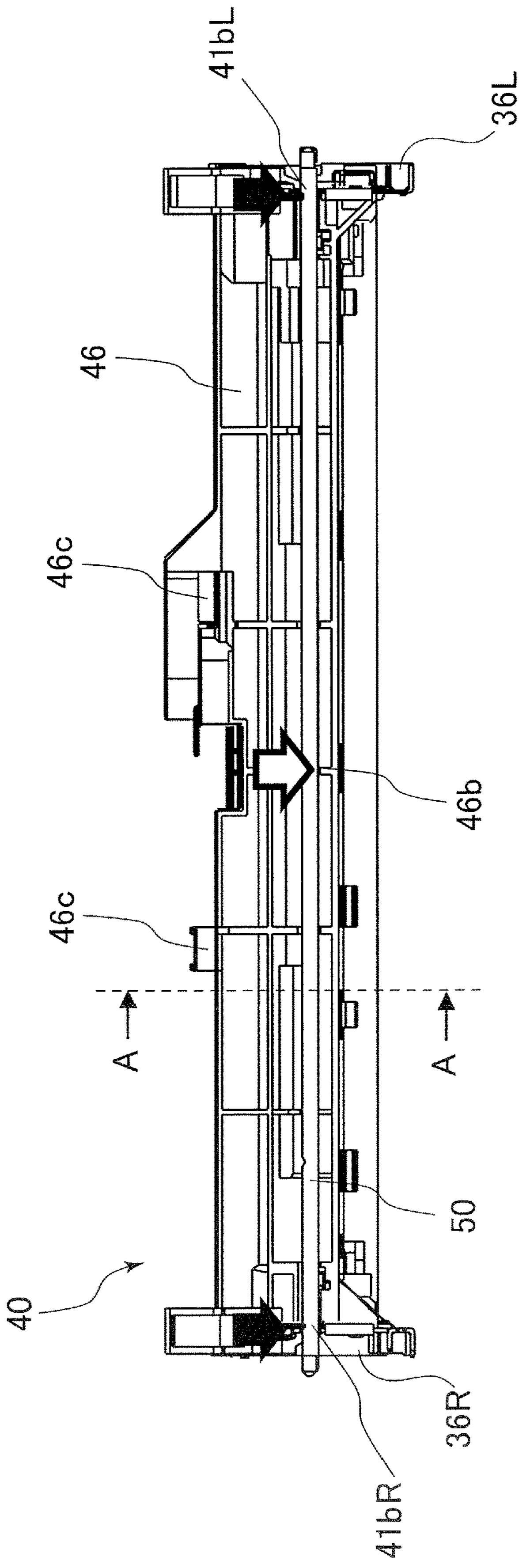
FIG. 9 is a front view of a rib provided on the cartridge tray.

As illustrated in FIG. 9, the positioning shaft 50 is rotatably supported by the shaft support portions 50aL and 50aR. In a state in which the cartridge tray 40 is attached to the apparatus body 100A, the positioning grooves 41bL and 41bR are positioned further on the inside than the shaft support portions 50aL and 50aR in the axial direction. Therefore, the center portion of the positioning shaft 50 receives a downward force applied by the weight of the cartridge tray 40 and by the pressing unit 33 and 34 illustrated in FIG. 11A, and may be warped downward, that is, in a direction indicated by a hollow arrow in FIG. 9.

Therefore, in the present exemplary embodiment, a rib 46b is formed in an approximate center portion of the coupling member 46 in the axial direction, that is, in the left-right direction. That is, the rib 46b is provided at a position between the body side plates 36L and 36R and between the positioning grooves 41bL and 41bR in the axial direction of the positioning shaft 50. The rib 46b abuts an approximate center portion of the positioning shaft 50 in the axial direction to support the positioning shaft 50 from below, and thus regulates downward warpage of the positioning shaft 50. To be noted, the rib 46b may support a different position of the positioning shaft 50 from below instead of the approximate center portion of the positioning shaft 50 in the axial direction. However, it is preferable to regulate the downward warpage of the positioning shaft 50 at the center portion of the positioning shaft 50. In addition, the rib 46b may be formed in a shape elongated in the axial direction, or a plurality of ribs 46b may be provided in the axial direction. In addition, although the downward warpage of the positioning shaft 50 is regulated by the rib 46b because the positioning shaft 50 receives a force in the gravity direction, the rib 46*b* does not have to contact the lower portion of the positioning shaft 50 as long as the member regulates the warpage of the positioning shaft 50 by receiving the force in the warping direction.

Figure 10:
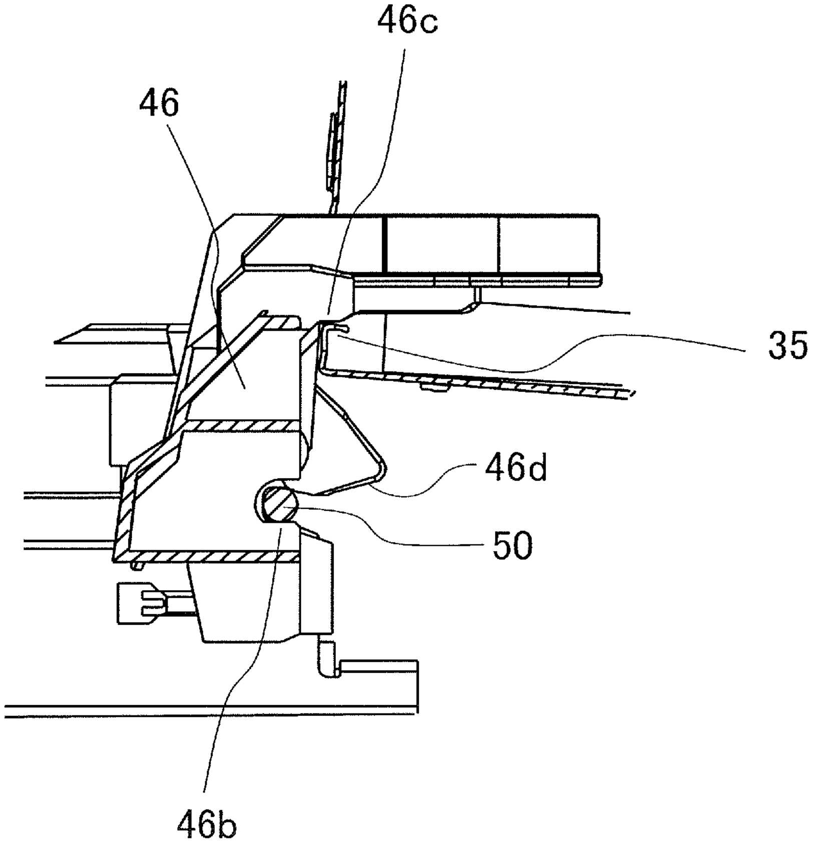
FIG. 10 is a section view of the cartridge tray taken along a line A-A of FIG. 9.

In addition, as illustrated in FIGS. 9 and 10, locking portions 46*c* capable of locking onto the fixing stay 35 are formed on the coupling member 46. The locking portions 46*c* can regulate the downward warpage of the cartridge tray 40 including the coupling member 46 by locking onto the fixing stay 35. By reducing downward warpage of the cartridge tray 40, deformation of the cartridge tray 40 at the positioning grooves 41*b*L and 41*b*R can be also reduced, and thus the cartridge tray 40 can be positioned with high precision with respect to the positioning shaft 50. To be noted, the locking portions 46*c* do not hinder the attachment operation of the cartridge tray 40, and the number thereof may be only one or three or more. In addition, one locking portion 46*c* elongated in the axial direction, that is, in the left-right direction, may be formed.

Draw-Out Operation and Attachment Operation of Cartridge Tray

Next, the draw-out operation and attachment operation of the cartridge tray 40 will be described. The product values of the process cartridges PPY, PPM, PPC, and PPK are lost when the developer is consumed to such a degree that it becomes impossible to form an image of a quality satisfactory the user that has purchased the process cartridges.

Therefore, an unillustrated detection portion that detects the amount of remaining developer of each process cartridge may be provided, and the detected amount of remaining developer may be compared by the controller 200 with a threshold value for cartridge lifetime notification or lifetime warning that is set in advance. In this case, when the detected amount of remaining developer of a process cartridge is smaller than the threshold value, a lifetime notification or lifetime warning is displayed for the process cartridge to prompt the user to replace the process cartridge. Then, the user opens the front door 31 of the printer 100, draws out the cartridge tray 40 to the outside of the apparatus, and replaces the process cartridge. The draw-out operation and attachment operation of the cartridge tray 40 will be described in detail below.

The front door 31 is supported so as to be openable and closeable with respect to the apparatus body 100A as illustrated in FIGS. 11A to 12B, and can be held in an open state by door links 32L and 32R coupling the front door 31 to the apparatus body 100A.

When the user opens the front door 31, a plurality of unillustrated link members move in an interlocked manner via the door links 32L and 32R, and the transfer unit 12 rotates around the driving roller 14 by about 1°. As a result of this, the photosensitive drum 1 of each process cartridge is separated from the intermediate transfer belt 13 as illustrated in FIG. 13C.

Figure 11B:
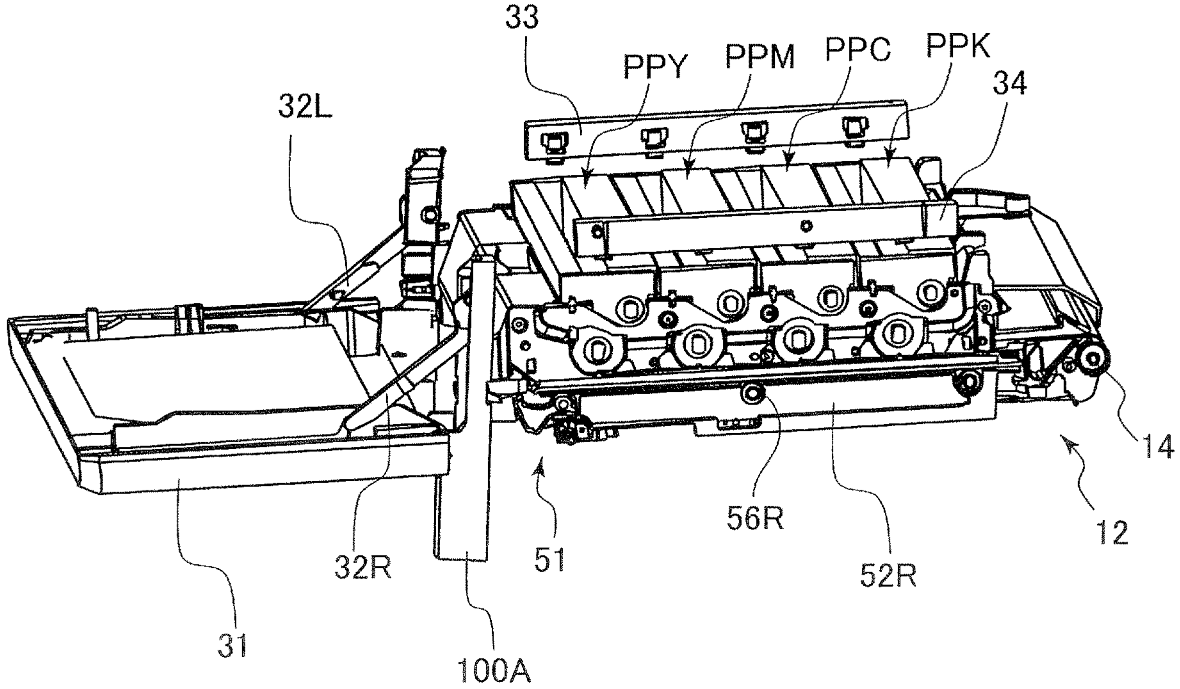
FIG. 11B is a front perspective view of the process cartridges and the cartridge tray in a state in which the front door is open.
Figure 12A:
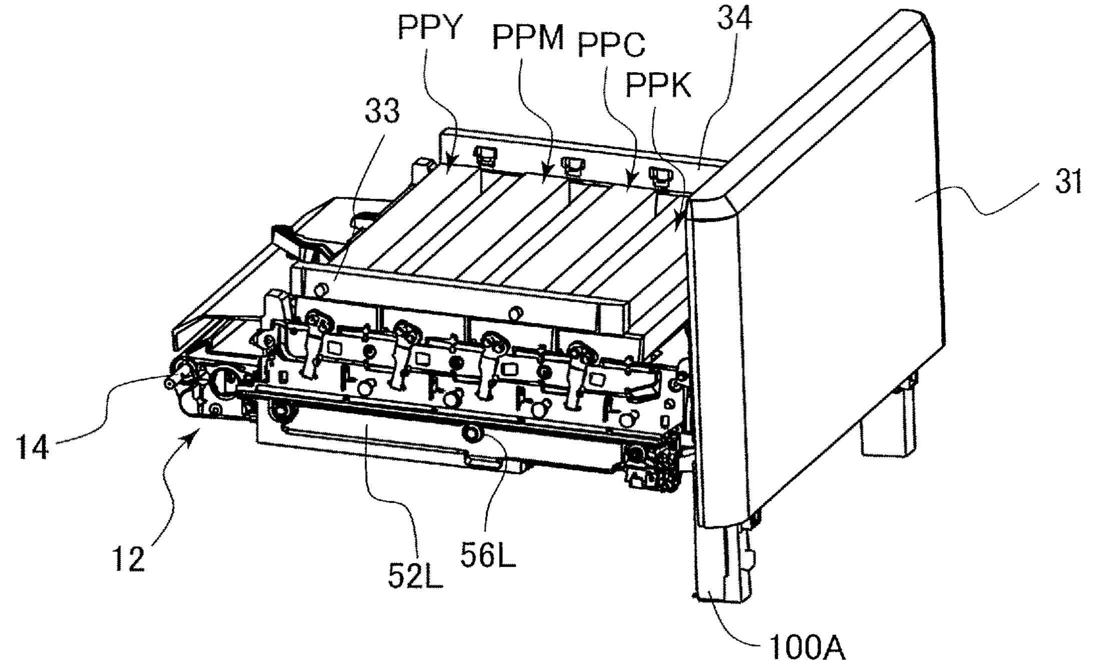
FIG. 12A is a rear perspective view of the process cartridges and the cartridge tray in the state in which the front door is closed.
Figure 12B:
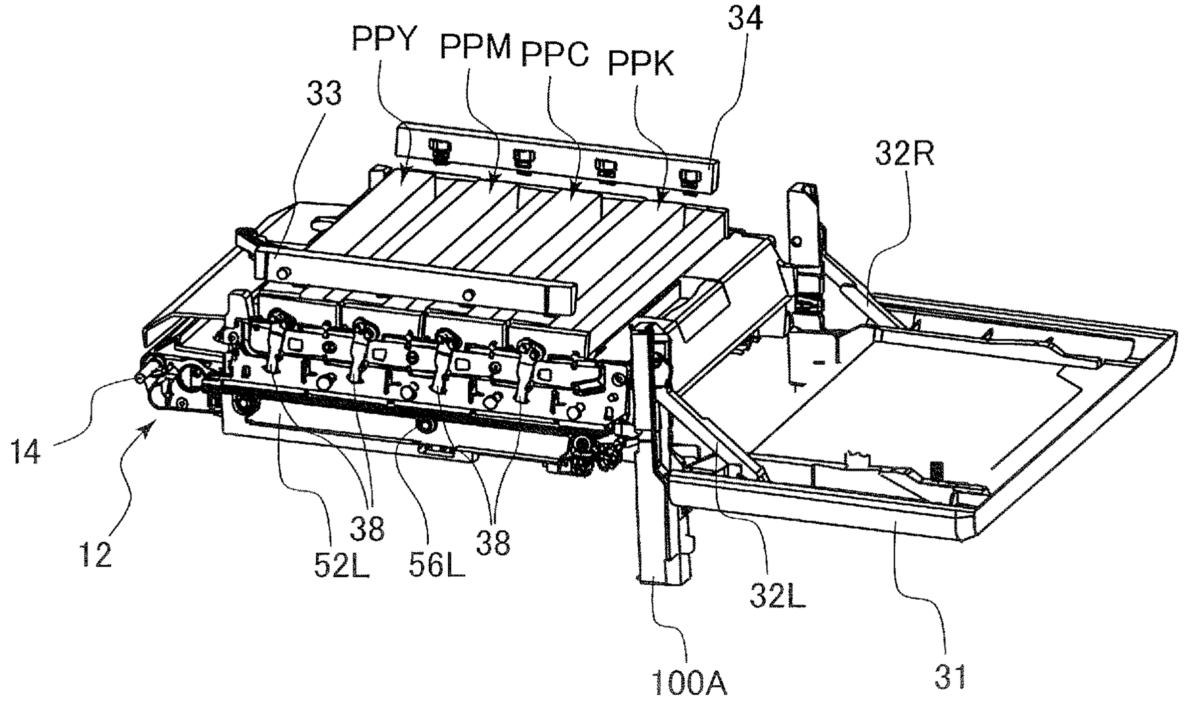
FIG. 12B is a rear perspective view of the process cartridges and the cartridge tray in the state in which the front door is open.

Next, as illustrated in FIG. 12B, each of contacts 38 provided on the left side, that is, the non-driving side of the apparatus body 100A is separated from the contact 2 of each developing roller 3 illustrated in FIG. 3B, and the pressurization by the pressing units 33 and 34 is cancelled. Next, the engagement with the drum coupling 1*c* and the developing coupling 3*c* illustrated in FIG. 3A on the driving side of each process cartridge is cancelled, and the pressurization of the cartridge tray 40 by tray pressing units 51 is cancelled as illustrated in FIGS. 11B and 13B. As a result of this, it becomes possible to take the cartridge tray 40 out of the apparatus body 100A.

Here, the tray pressing units 51 are respectively provided on the holders 52L and 52R respectively supported by the body side plates 36L and 36R, and press the cartridge tray 40 from the rear side to the front side during image formation. The tray pressing units 51 each include a tray pressing lever 53, a tray pressing link 54, and an urging spring 55 as illustrated in FIGS. 13A and 13B.

Figure 13A:
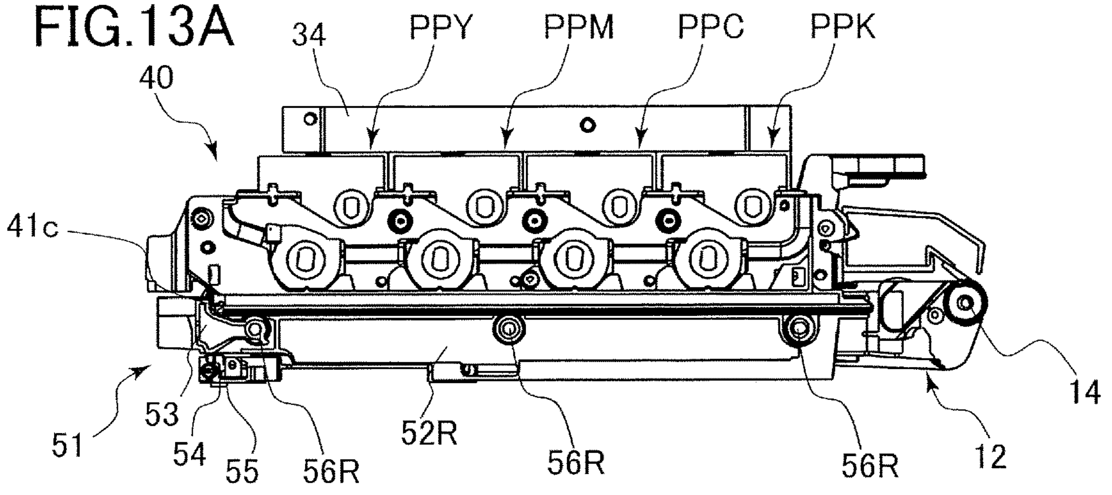
FIG. 13A is a side view of the process cartridges and the cartridge tray in the state in which the front door is closed.
Figure 13B:
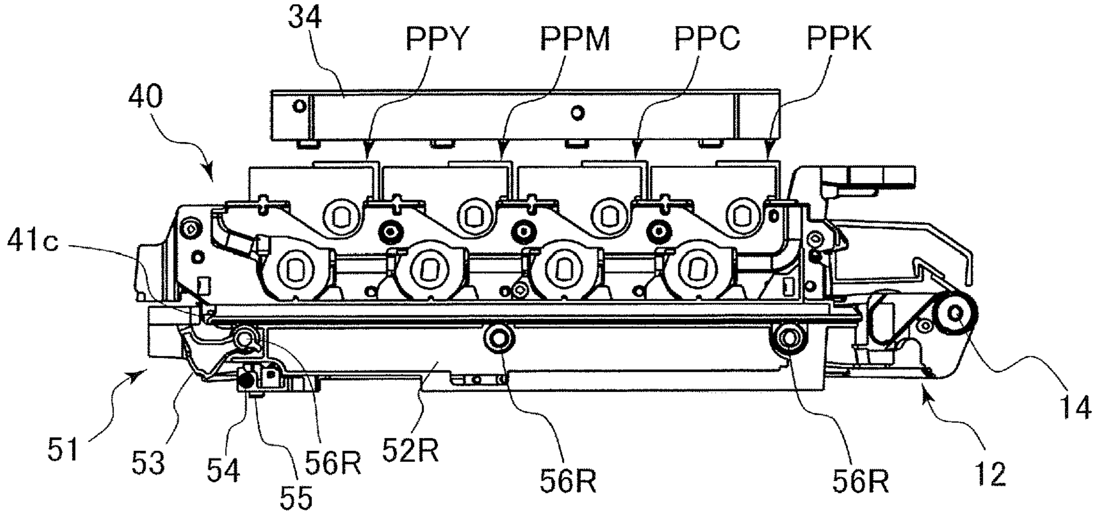
FIG. 13B is a side view of the process cartridges and the cartridge tray in the state in which the front door is open.
Figure 13C:
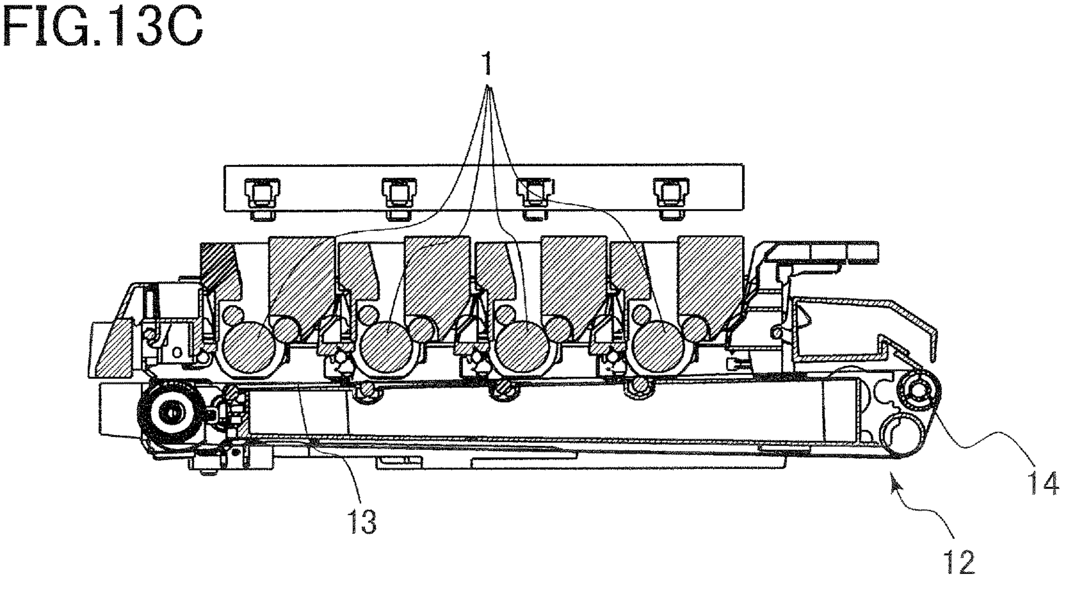
FIG. 13C is a side view of the process cartridges and the cartridge tray in the state in which the front door is open.

As illustrated in FIG. 13A, the tray pressing lever 53 is pressed by the tray pressing link 54 urged by the urging spring 55 in a state in which the front door 31 is closed. As a result of this, the tray pressing lever 53 presses a pressed portion 41*c* formed on the tray side plate 41R of the cartridge tray 40 to the rear side.

As illustrated in FIG. 13B, when the front door 31 is opened, the tray pressing lever 53 is retracted downward by the door links 32L and 32R and unillustrated link members. As a result of this, the pressurization of the cartridge tray 40 to the rear side by the tray pressing lever 53 is cancelled, and it becomes possible to take the cartridge tray 40 out of the apparatus body 100A.

Next, although motion of the surroundings of the positioning shafts 49 and 50 will be described with reference to FIGS. 8A to 8F, since the positioning configuration of the cartridge tray 40 is the same between the left side and the right side of the positioning shafts 49 and 50, only the right side of the apparatus will be described, and description of the left side of the apparatus will be omitted. As illustrated in FIGS. 8A to 8F, when the cartridge tray 40 starts being drawn out, the inclined surface 41*f* slides on the positioning shaft 50, and therefore the rear side of the cartridge tray 40 is slightly lifted. Then, the cartridge tray 40 moves in a draw-out direction Y2 while the sliding surface 46*d* provided on the coupling member 46 of the cartridge tray 40 slides on the positioning shaft 50.

Figure 8E:
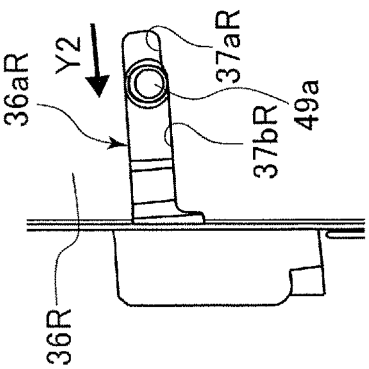
FIG. 8E is a section view of the printer illustrating the positioning shaft and the positioning groove in a state in which the cartridge tray is slightly drawn out from the attached state.
Figure 8F:
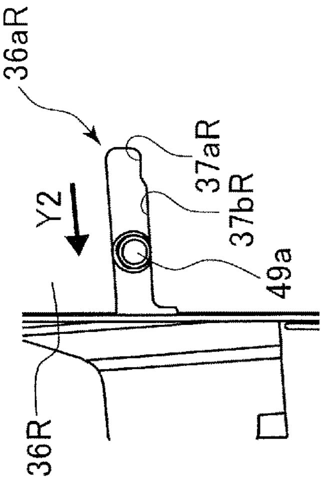
FIG. 8F is a section view of the printer illustrating the positioning shaft and the positioning groove in a state in which the cartridge tray is further drawn out from the state of FIG. 8E.

At the same time, the end portion 49*a* of the positioning shaft 49 of the cartridge tray 40 is released from the fitting groove 37*a*R of the positioning groove 36*a*R, and moves on to the guide groove 37*b*R. The cartridge tray 40 is drawn out in the draw-out direction Y2 while the end portion 49*a* of the positioning shaft 49 is guided by the guide groove 37*b*R. FIGS. 8A and 8D each illustrate a state in which the cartridge tray 40 is in the attached position. FIGS. 8B and 8E each illustrate a state in which the cartridge tray 40 is drawn out from the attached position by about 3 mm. FIGS. 8C and 8F each illustrate a state in which the cartridge tray 40 is drawn out from the attached position by about 10 mm.

When the cartridge tray 40 is drawn out to some extent, the guide members 47L and 47R of the cartridge tray 40 are guided on the rollers 56L and 56R as illustrated in FIGS. 11B and 12B. Then, the cartridge tray 40 is drawn out of the apparatus body 100A. To be noted, at the time of image formation, the cartridge tray 40 is not in contact with the rollers 56L and 56R, and a clearance of about 0.5 mm is secured.

After the cartridge tray 40 is drawn out and a process cartridge is replaced, the cartridge tray 40 is attached to the apparatus body 100A. The attachment operation of attaching the cartridge tray 40 to the apparatus body 100A is the reverse of the draw-out operation. At this time, first, the sliding surface 46*d* starts sliding on the positioning shaft 50, and the end portion 49*a* of the positioning shaft 49 is passed onto the fitting groove 37*a*R from the guide groove 37*b*R after the positioning shaft 50 has passed the sliding surface 46*d*, as illustrated in FIGS. 8B and 8E.

Since the boundary portion between the guide groove 37*b*R and the fitting groove 37*a*R has upward inclination and the end portion 49*a* of the positioning shaft 49 fits in the fitting groove 37*a*R, an operation force for the user to attach the cartridge tray 40 is large. However, since the positioning shaft 49 enters the fitting groove 37*a*R after the positioning shaft 50 has passed the sliding surface 46*d*, the timing when the operation force of the user increases does not concentrate, and therefore the operation force can be reduced. To be noted, the cartridge tray 40 is configured to be automatically pulled in to the attached position by a pull-in apparatus that will be described later when the cartridge tray 40 is inserted to a position at a predetermined distance from the attachment position on the front side.

When the cartridge tray 40 is inserted to the attached position and the front door 31 is closed, the tray pressing units 51 press the cartridge tray 40 to the rear side as illustrated in FIGS. 11A, 12A, and 13A. Then, the drum coupling 1*c* and the developing coupling 3*c* on the driving side of each process cartridge illustrated in FIG. 3A engage, and the pressing units 33 and 34 press the process cartridges from above. Further, the contacts 38 come into contact with the contacts 2 of the respective developing rollers 3 illustrated in FIG. 3B, and the transfer unit 12 rotates upward about the driving roller 14. As a result of this, the photosensitive drum 1 of each process cartridge comes into contact with the intermediate transfer belt 13.

As described above, in a state in which the front door 31 is closed and the printer 100 is capable of forming an image, the positioning shaft 50 engages with the positioning grooves 41*b*L and 41*b*R on the front side of the cartridge tray 40. At this time, since the positioning grooves 41*b*L and the 41*b*R are provided with the inclined surface 41*f*, the cartridge tray 40 is pulled in the attachment direction Y1 on the basis of the weight of the cartridge tray 40 and the downward force from the pressing units 33 and 34. As a result of this, the positioning surface 41*e* is pressed against the positioning shaft 50, and thus the cartridge tray 40 can be positioned in the attachment direction Y1 with a high precision.

In addition, the positioning shaft 49 engages with the positioning grooves 36*a*L and 36*a*R on the rear side of the cartridge tray 40. At this time, since the end portion 49*a* of the positioning shaft 49 fits in the fitting grooves of the positioning grooves 36*a*L and 36*a*R, rotation of the cartridge tray 40 in a direction perpendicular to the attachment direction Y1, that is, rotation of the cartridge tray 40 about the positioning shaft 50 can be restricted.

The positioning shaft 50 and the positioning grooves 36*a*L and 36*a*R that are provided in the apparatus body 100A and the positioning shaft 49 and the positioning grooves 41*b*L and 41*b*R that are provided in the cartridge tray 40 constitute a positioning mechanism 60 illustrated in FIGS. 8A and 8D. The positioning mechanism 60 positions the cartridge tray 40 with respect to the apparatus body 100A.

Further, since the positioning shaft 50 is supported from below by the rib 46*b* provided on the coupling member 46 of the cartridge tray 40, downward warpage, that is, deformation of the positioning shaft 50 is regulated. In addition, the locking portions 46*c* provided on the coupling member 46 reduce deformation of the cartridge tray 40 itself. Further, since the positioning shaft 49 on the rear side of the cartridge tray 40 is also supported from below by the shaft contact portion 42*c*, downward warpage of the positioning shaft 49 is regulated. According to such a configuration, the shaft diameter of the positioning shafts 49 and 50 can be reduced, the positioning shafts 49 and 50 can be formed from a cheaper resin material, and thus the cost and size can be reduced.

According to these, the cartridge tray 40 can be positioned at the attached position with high precision with respect to the apparatus body 100A, and the positioning precision of the cartridge tray 40 can be improved. Particularly, although the process cartridges held by the cartridge tray 40 are pressed from above by the pressing units 33 and 34 during image formation, this does not affect the positioning precision of the cartridge tray 40. Therefore, the positioning precision of each process cartridge held by the cartridge tray 40, specifically, the positioning precision between the photosensitive drum 1 and the intermediate transfer belt 13 is improved, and thus an image of high quality can be formed.

In addition, the cartridge tray 40 is urged to the front side at the attached position by the effect of the inclined surface 41*f* on the front side of the cartridge tray 40 and pressurization by the tray pressing units 51 on the rear side. Therefore, displacement of the cartridge tray 40 caused by vibration at the time of image formation or the like can be suppressed. In addition, by generating pressing force on the front side and rear side of the cartridge tray 40, the pressing force can be distributed, and thus the urging springs 55 of the tray pressing units 51 can be configured to have smaller elasticity. As a result of this, the size and cost of the tray pressing units 51 can be reduced.

To be noted, the positioning shaft 50 and the positioning grooves 41*b*L and 41*b*R that are included in the positioning mechanism 60 may be interchanged as long as the positioning shaft 50 is provided in one of the apparatus body 100A and the cartridge tray 40 and the positioning grooves 41*b*L and 41*b*R are provided in the other. In addition, the positioning shaft 49 and the positioning grooves 36*a*L and 36*a*R that are included in the positioning mechanism 60 may be interchanged as long as the positioning shaft 49 is provided in one of the apparatus body 100A and the cartridge tray 40 and the positioning grooves 36*a*L and 36*a*R are provided in the other.

In addition, the positioning shaft 49 does not have to be a penetrating shaft that extends in the entirety of the cartridge tray 40 in the left-right direction, and may be in any form as long as two projections projecting from the both sides of the cartridge tray 40 are formed.

In addition, although each process cartridge is formed by integrating the drum unit OP and the developing unit DP, these may be separately provided. Further, for example, a configuration in which the cartridge tray 40 only holds the drum unit OP and a configuration in which the cartridge tray 40 only holds the developing unit DP may be employed.

Pull-In Apparatus

Figure 14:
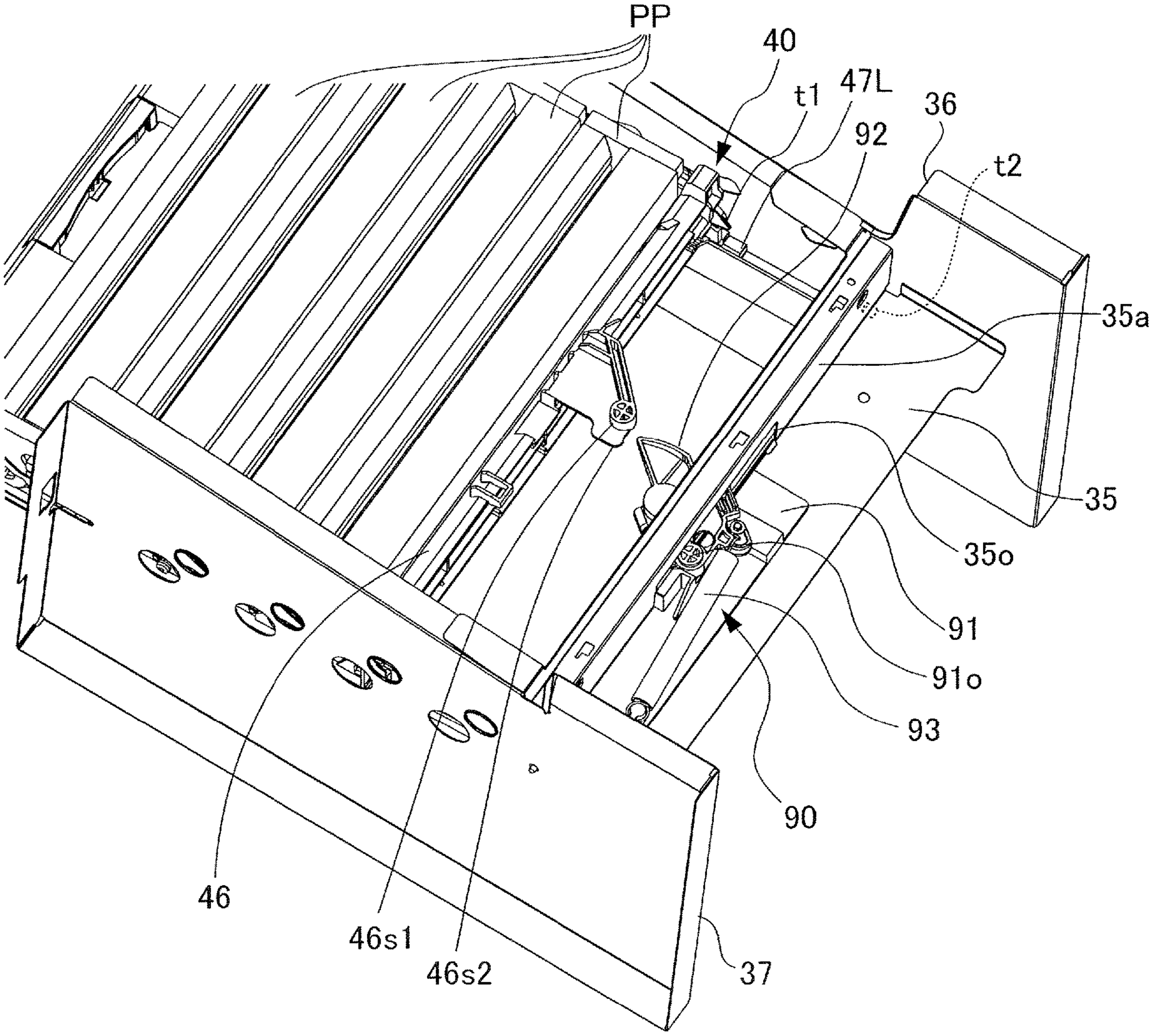
FIG. 14 is a perspective view of a pull-in apparatus according to a first exemplary embodiment.
Figure 15:
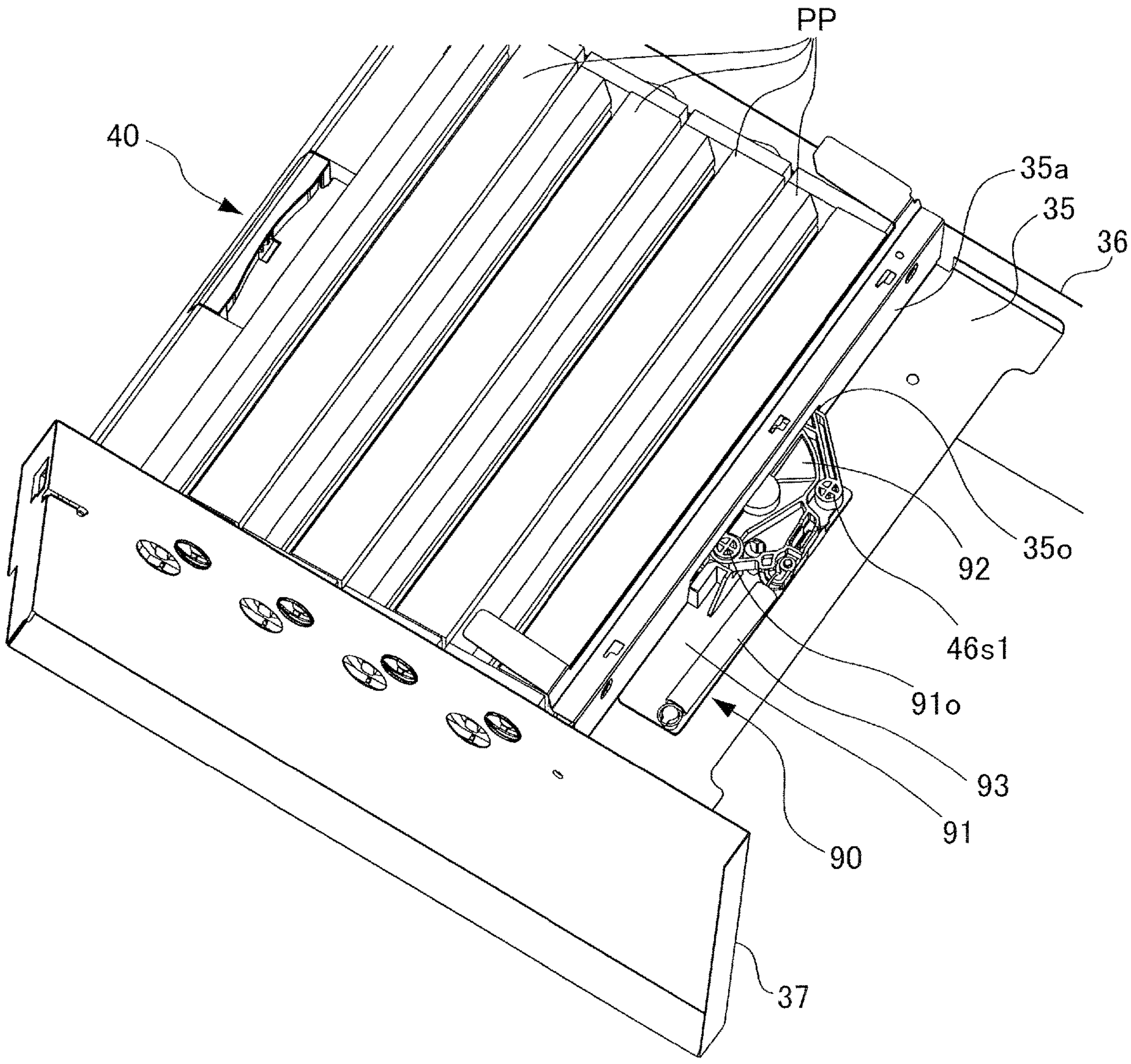
FIG. 15 is a perspective view of the pull-in apparatus according to the first exemplary embodiment.

A pull-in apparatus 90 of the present exemplary embodiment will be described below. As illustrated in FIGS. 14 and 15, the pull-in apparatus 90 has a function of pulling in the cartridge tray 40, which is an example of a unit (i.e., draw-out unit) that can be drawn out from the apparatus body, to a predetermined position in the apparatus body. In the present exemplary embodiment, the attached position of FIG. 15 serves as the predetermined position.

FIG. 14 illustrates a state before the pull-in apparatus 90 pulls in the cartridge tray 40 as viewed from above. The pull-in apparatus 90 includes a holder 91, an arm 92, an arm spring 93, a locking member 94 that will be described later, and a first action portion 46*s*1 and a second action portion 46*s*2 that are provided in the cartridge tray 40. The arm 92 serves as an arm member of the present exemplary embodiment, the locking member 94 serves as a restriction member of the present exemplary embodiment, and the arm spring 93 serves as an urging member (i.e., arm urging member) of the present exemplary embodiment. In addition, the first action portion 46s1 serves as a first abutting portion of the present exemplary embodiment, and the second action portion 46s2 serves as a second abutting portion of the present exemplary embodiment.

The holder 91 is fixed to the fixing stay 35 of the apparatus body, and pivotably holds the arm 92 at a pivot support portion 91o. The arm 92 is always urged in a clockwise direction in FIG. 14 by the arm spring 93. The arm 92 pulls in the first action portion 46s1 by this urging force to move the cartridge tray 40 toward the rear side of the apparatus, and thus a pulled-in state illustrated in FIG. 15 is achieved. In the pulled-in state, the tray positioning portion 41b described above engages with the positioning shaft 50, the positioning shaft 49 engages with the body positioning portion 36a, and thus the cartridge tray 40 is positioned. To be noted, in a stand-by state illustrated in FIG. 14 in which the cartridge tray 40 is drawn out to a position where attachment/detachment of a process cartridge PP is performed, pivoting of the arm 92 is restricted by a locking mechanism that will be described later.

The urging force that the arm spring 93 applies to the arm 92 is adjusted in accordance with the total weight of the cartridge tray 40 including the process cartridges PP. In the configuration example to which the present exemplary embodiment is applied, a good operability can be obtained in the case where the urging force of the arm 92 is set to 2 kgf. This value is about 1 kgf to 1.5 kgf in terms of a force of pulling the cartridge tray 40 in the attachment direction. This is set to be smaller than force in the same direction generated by the tray pressing units 51 described above and by the contact between the inclined surface 41f and the positioning shaft 50. Meanwhile, the magnitude of the urging force of the arm spring 93 is set such that the cartridge tray 40 can be pulled in to the attached position against the frictional drag between the sliding surface 46d illustrated in FIGS. 8A to 8C described above and the positioning shaft 50.

Figure 16A:
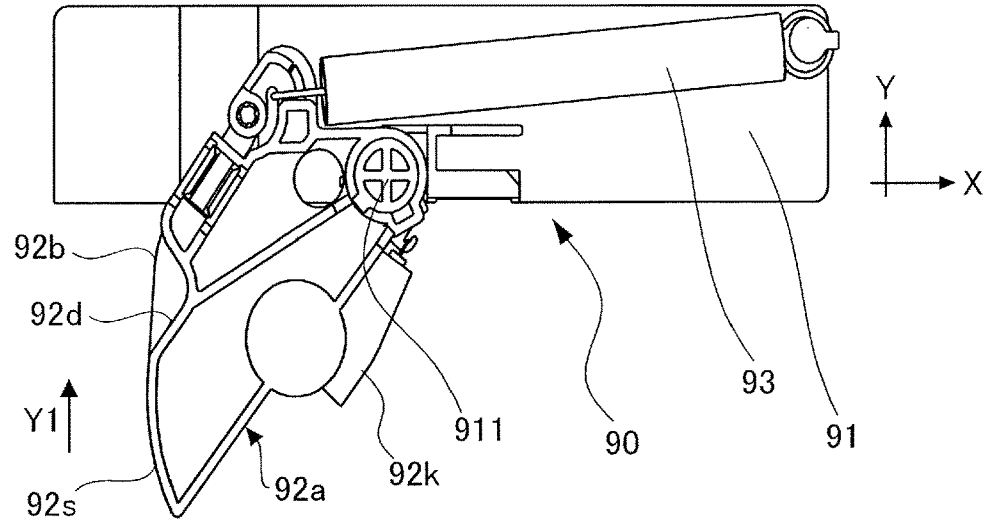
FIG. 16A is a top view of the pull-in apparatus according to the first exemplary embodiment.
Figure 16B:
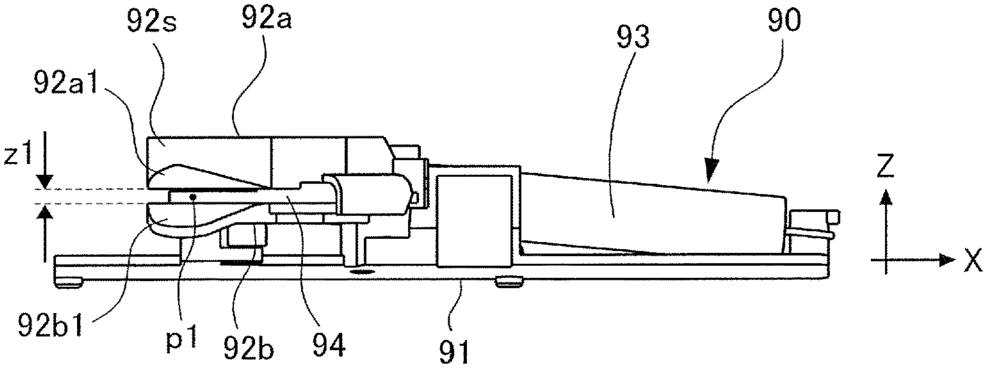
FIG. 16B is a side view of the pull-in apparatus according to the first exemplary embodiment.
Figure 16C:
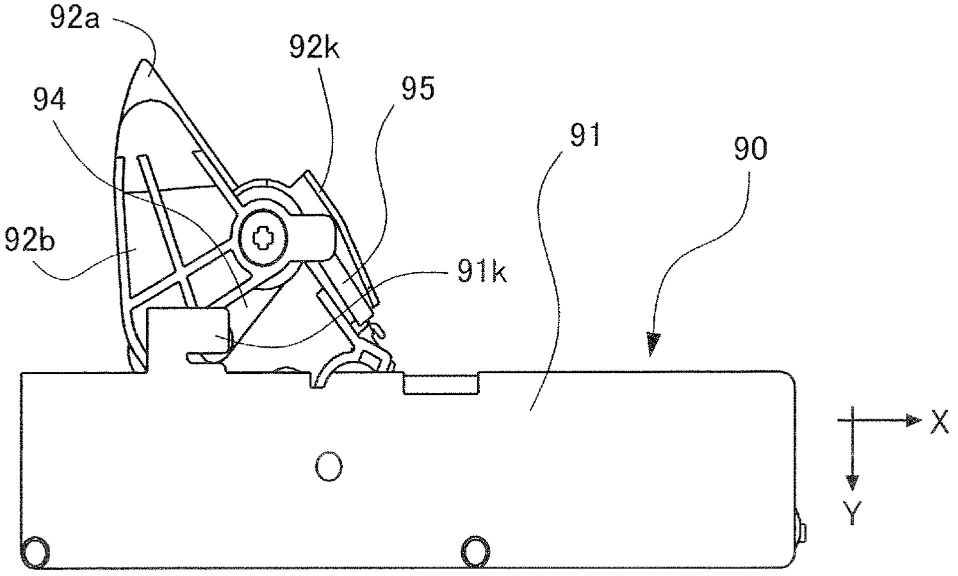
FIG. 16C is a bottom view of the pull-in apparatus according to the first exemplary embodiment.

FIGS. 16A, 16B, and 16C illustrate components of the pull-in apparatus 90 on the apparatus body side as viewed from above, as viewed horizontally, and as viewed from below, respectively. In the figures, the left-right direction of the image forming apparatus is set as an X-axis direction, the front-rear direction, that is, the attachment direction of the cartridge tray 40, is set as a Y-axis direction, and the vertical direction (i.e., gravity direction) perpendicular to the X-axis direction and the Y-axis direction is set as a Z-axis direction.

The arm 92 is capable of pivoting between the position of the stand-by state illustrated in FIGS. 14 and 16A to 16C and the position of the pulled-in state illustrated in FIG. 15 about the pivot support portion 91o extending in the Z-axis direction. That is, the direction of the pivot axis of the arm 92 (i.e., rotation axis of the arm member) of the present exemplary embodiment approximately coincides with the vertical direction. In the description below, the position of the arm 92 in the stand-by state will be referred to as a "stand-by position", and the position of the arm 92 in the pulled-in state will be referred to as a "pulled-in position". In addition, the pivot direction of the arm 92 serving as a first direction from the stand-by position toward the pulled-in position will be referred to as a "pull-in direction", and the pivot direction of the arm 92 serving as a second direction from the pulled-in position toward the stand-by position will be referred to as a "returning direction".

In the stand-by position, the arm 92 projects toward the front side of the image forming apparatus through an opening portion 35o illustrated in FIG. 14 provided in a front side wall surface 35a of the fixing stay 35. When the arm 92 moves to the pulled-in position, the arm 92 is retracted toward the rear side of the image forming apparatus together with the first action portion 46s1 and the second action portion 46s2 with respect to the opening portion 35o as illustrated in FIG. 15. In addition, the arm spring 93 of the present exemplary embodiment is configured to urge the arm 92 in a pull-in direction R1 in the entire range from the stand-by position to the pulled-in position.

As illustrated in FIGS. 16A to 16C, a first engagement surface 92s and a second engagement surface 92d that abut the first action portion 46s1 are provided on the arm 92. The first engagement surface 92s is a portion that abuts the first action portion 46s1 to release the locking by the locking mechanism in an initial stage of a pull-in operation. The second engagement surface 92d is a portion that abuts the first action portion 46s1 to receive the force to pull in the cartridge tray 40 from the arm 92 pivoted by the urging force of the arm spring 93 after the locking by the locking mechanism is released.

Figure 17:
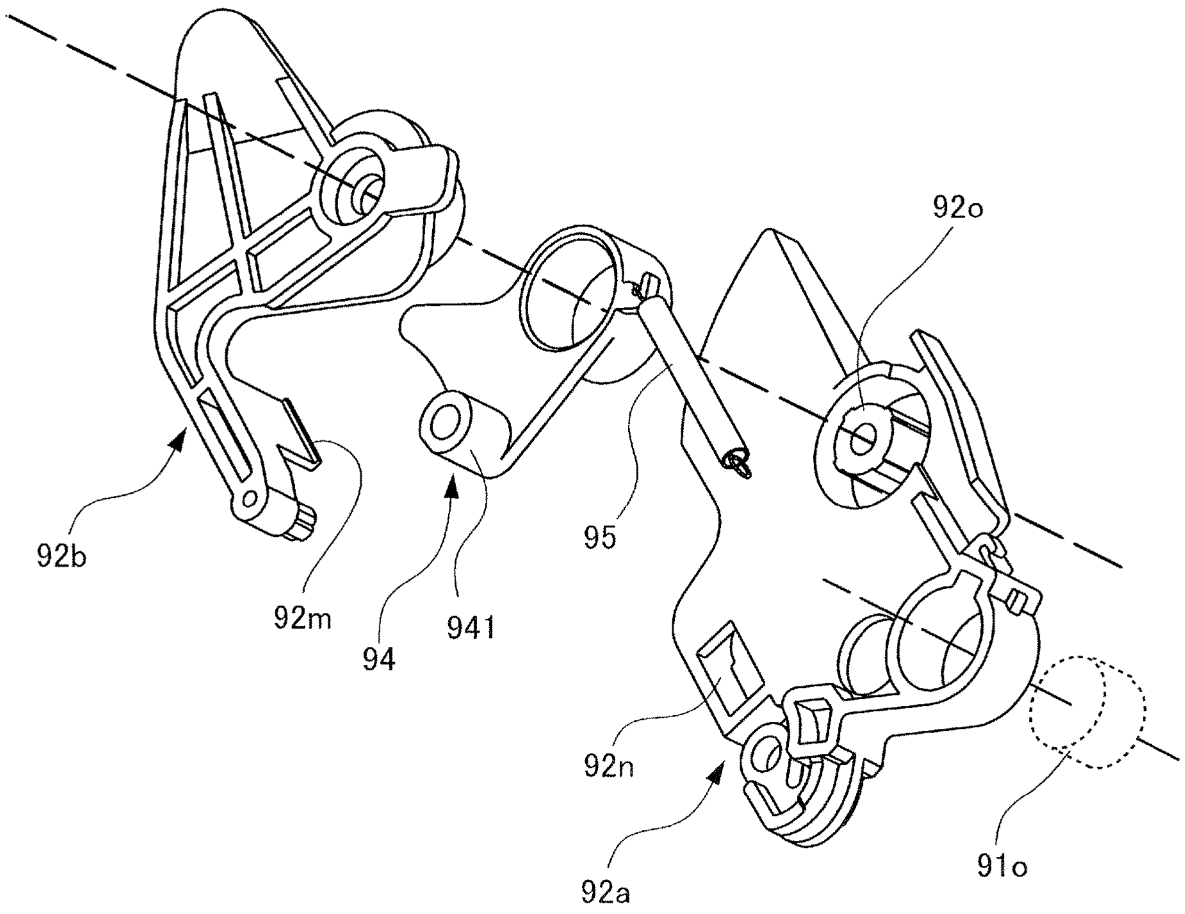
FIG. 17 is an exploded view of an arm and a locking member according to the first exemplary embodiment.

FIG. 17 is an exploded view of the arm 92 and the locking member 94. The arm 92 is formed by integrating an arm upper portion 92a serving as a first portion of the present exemplary embodiment and an arm lower portion 92b serving as a second portion of the present exemplary embodiment by fastening members such as screws and by engagement between an elastic claw portion 92m and a hole portion 92n. The locking member 94 is held between the arm upper portion 92a and the arm lower portion 92b. In addition, the locking member 94 includes a pressing portion 94s pressed by the second action portion 46s2 at the time of inserting the cartridge tray 40, and an abutting portion 941 that abuts an abutted portion 911 illustrated in FIGS. 18A and 18B that is provided in the holder 91, that is, fixed with respect to the apparatus body.

The locking member 94 and a locking spring 95, which serves as a locking urging member, constitute a locking mechanism that locks the arm 92 in the stand-by position in the drawn-out state of the cartridge tray 40. In the description below, the position of the locking member 94 at which the abutting portion 941 faces the abutted portion 911 to restrict pivoting of the arm 92 will be referred to as a "locked position", and the position of the locking member 94 at which the abutting portion 941 is separated from the abutted portion 911 to allow the pivoting of the arm 92 will be referred to as a "lock-release position".

The locking member 94 is supported by the arm 92 so as to be pivotable about a pivot 92o, and is always urged in a counterclockwise direction in FIG. 17 by the locking spring 95. The urging force of the locking spring 95 may be set such that free pivoting of the locking member 94 with respect to the arm 92 is restricted, and the urging force is set to a smaller load than that of the arm spring 93. In the configuration example to which the present exemplary embodiment is applied, it is preferable to set the urging force of the arm spring 93 to 50 gf.

As illustrated in FIG. 16B, the locking member 94, which is a plate-like member, is sandwiched between the arm upper portion 92a serving as a first portion and the arm lower portion 92b serving as a second portion, which are two plate-like members, in an orientation perpendicularly intersecting the Z-axis direction. That is, the thickness of the locking member 94 is smaller than an interval z1 between the arm upper portion 92a and the arm lower portion 92b in the Z-axis direction. The interval z1 is set to such a value that the fingertip of a person does not get caught between the arm upper portion 92a and the arm lower portion 92b, for example, a value equal to or smaller than 5 mm.

As a guide shape for guiding the second action portion **46*s*2 in the cartridge tray, inclined surfaces 92*a*1 and 92*b*1 of the arm upper portion 92*a* and the arm lower portion 92*b* are provided at an upstream end portion of the arm 92 in the attachment direction Y1 at the stand-by position. The inclined surfaces 92*a*1 and 92*b*1 are opposed to each other in the Z-axis direction, and are each inclined with respect to the X-Y plane such that the interval therebetween in the Z-axis direction is smaller on the more downstream side in the attachment direction Y1. In addition, the inclined surfaces 92*a*1 and 92*b*1 are formed in a region that overlaps with a position p1 in the X-axis direction where the second action portion 46*s*2 first abuts the locking member 94**.

Figure 18B:
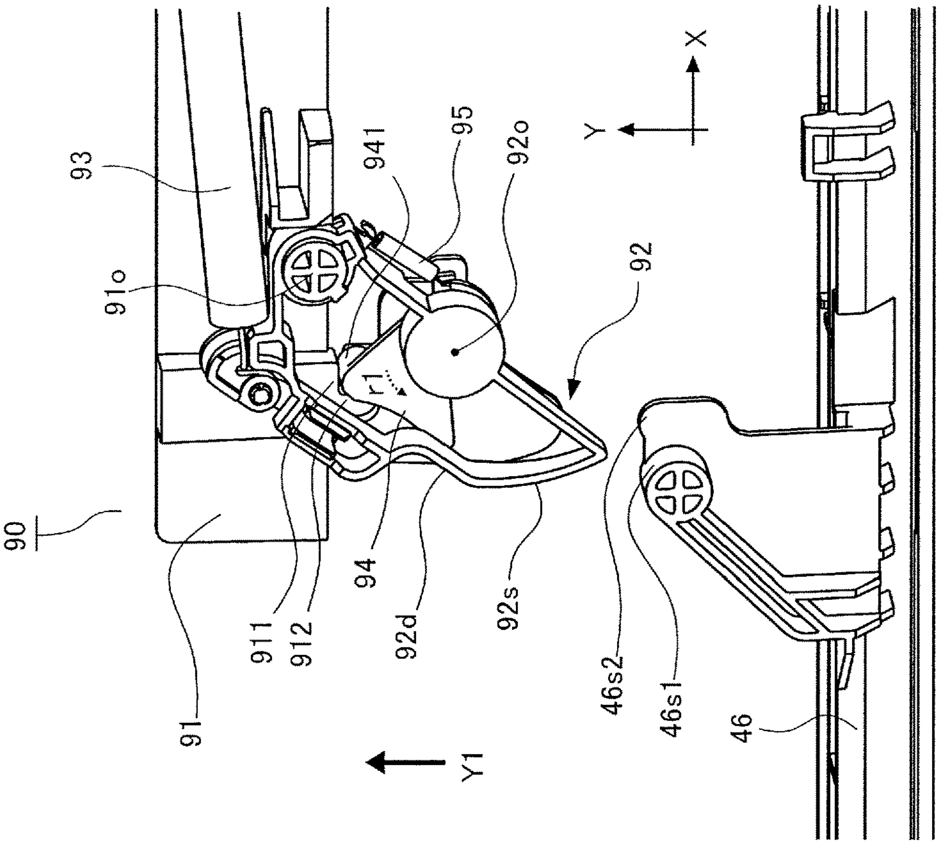
FIGS. 18A and 18B are each a diagram for describing an operation of the pull-in apparatus according to the first exemplary embodiment.
Figure 18A:
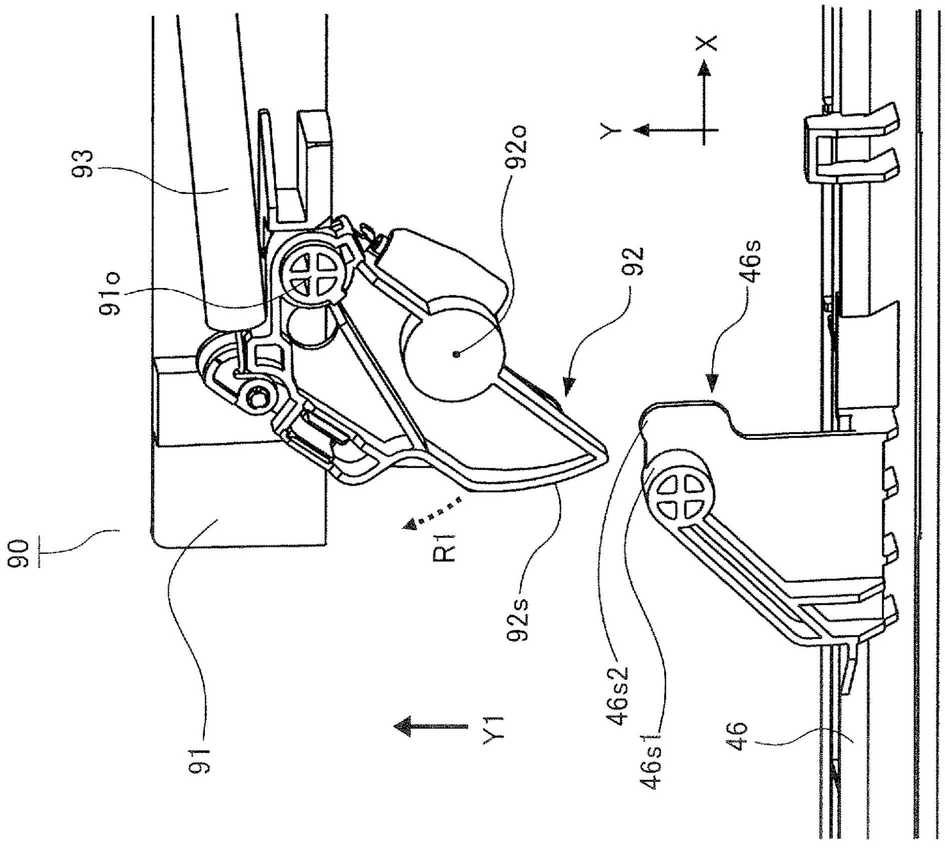

As illustrated in FIGS. 14 and 18A, the first action portion **46*s*1 and the second action portion 46*s*2 are provided on the coupling member 46 positioned on the most rear side in the cartridge tray 40. The first action portion 46*s*1 and the second action portion 46*s*2 of the present exemplary embodiment are each a resin molded product 46*s* integrally molded from a resin material, and projects from the coupling member 46 toward the downstream side in the attachment direction Y1 of the cartridge tray 40. The first action portion 46*s*1 has a columnar shape extending in the Z-axis direction, and the second action portion 46*s*2 has a plate-like shape perpendicular to the Z-axis direction. The thickness of the second action portion 46*s*2 is set to a value smaller than the interval z1 between the arm upper portion 92*a* and the arm lower portion 92*b*** described above.

Operation of Pull-In Apparatus

An operation of the pull-in apparatus 90 will be described below with reference to FIGS. 18A to 21B. FIGS. 18A and 18B correspond to the stand-by state in which the cartridge tray 40 is drawn out of the apparatus body, FIGS. 19A and 19B correspond to a first stage of a lock-release operation, FIGS. 20A and 20B correspond to a second stage of the lock-release operation, and FIGS. 21A and 21B correspond to the pulled-in state in which the cartridge tray 40 is pulled in to the attached position. In addition, FIGS. 18A, 19A, 20A, and 21A illustrate the pull-in apparatus 90 as viewed from above, and FIGS. 18B, 19B, 20B, and 21B are perspective views of the pull-in apparatus 90 in which a part of the arm upper portion **92*a*** is made invisible.

In the stand-by state illustrated in FIGS. 18A and 18B, the first action portion **46*s*1 and the second action portion 46*s*2 are separated from the arm 92, and the arm 92 is in the stand-by position. To be noted, although the cartridge tray 40 is illustrated in FIGS. 18A and 18B for the sake of description, in the case of performing attachment/detachment of a process cartridge, the cartridge tray 40 is at a position lower than the position illustrated in FIGS. 18A and 18B with respect to the arm 92. In the stand-by state, the locking member 94 is engaged with the holder 91 as illustrated in FIG. 18B, and the arm 92 is in a locked state in which pivoting in the pull-in direction R1 is restricted. That is, although an urging force in the clockwise direction in FIGS. 18A and 18B is applied to the arm 92 from the arm spring 93, the locking member 94 pivotably supported by the arm 92 is abutting the abutted portion 911 of the holder 91 at the abutting portion 941. Therefore, the pivot 92*o* of the locking member 94 cannot move in the pull-in direction R1 with respect to the pivot support portion 91*o* of the arm 92, and thus the arm 92 does not pivot in the pull-in direction R1**.

Figure 20B:
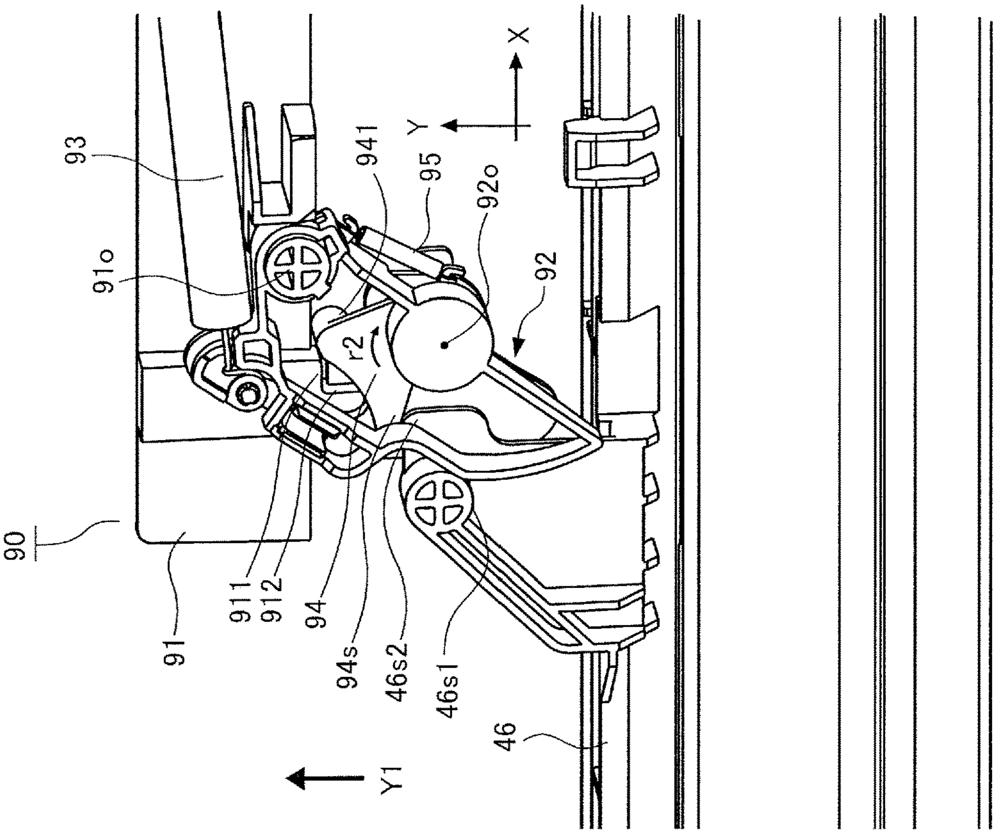
FIGS. 20A and 20B are each a diagram for describing an operation of the pull-in apparatus according to the first exemplary embodiment.

In addition, in the stand-by state, although the locking member 94 is pressed in a counterclockwise direction r1 in FIGS. 18A and 18B by a reaction force from the abutted portion 911, the locking member 94 abuts a wall surface 912 illustrated in FIG. 20B adjacent to the abutted portion 911.

Therefore, pivoting of the locking member 94 in the counterclockwise direction in the stand-by state is restricted, and the locking member 94 is kept at the locked position.

Figure 19B:
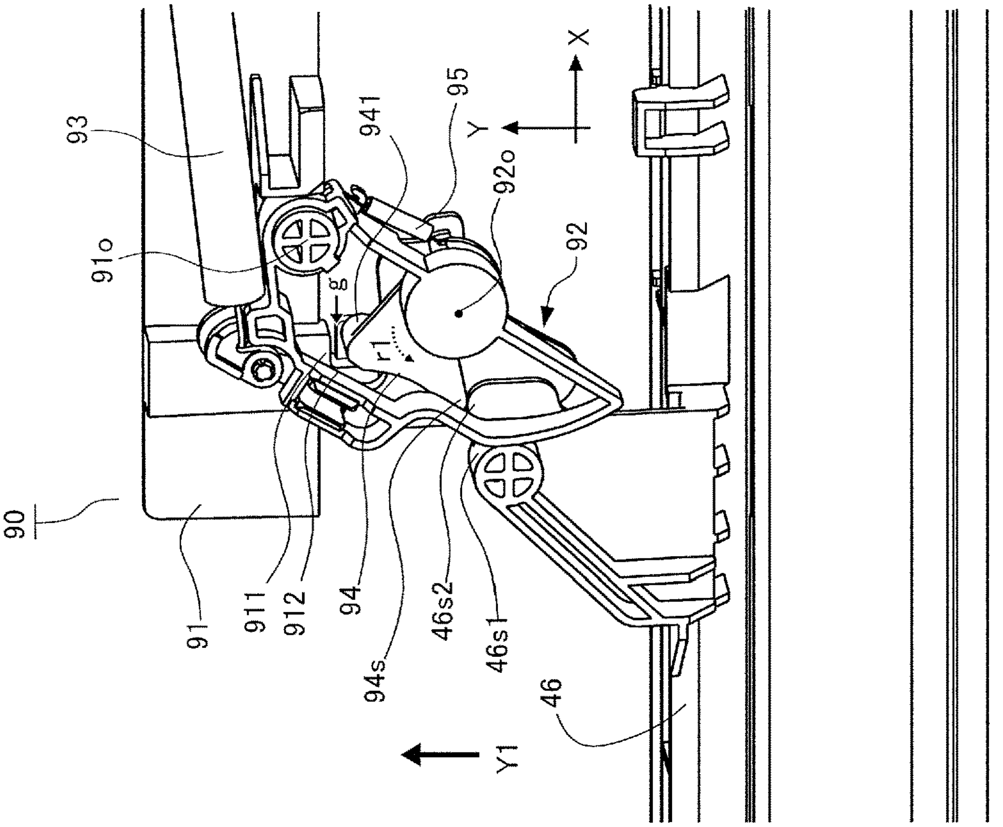
FIGS. 19A and 19B are each a diagram for describing an operation of the pull-in apparatus according to the first exemplary embodiment.
Figure 19A:
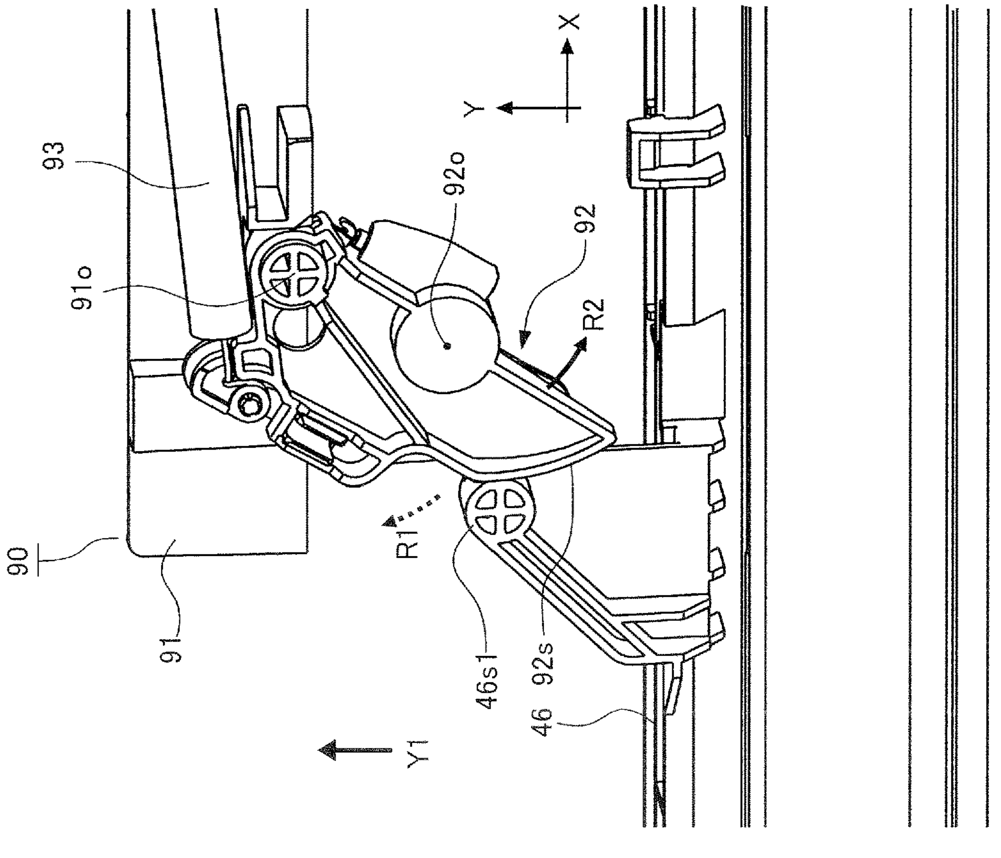

FIGS. 19A and 19B illustrate a first stage of a lock-release operation of releasing the locking of the arm 92 in the course of inserting the cartridge tray 40 in the apparatus body. When the cartridge tray 40 moves in the attachment direction Y1 of the tray to approach the arm 92, first, the first action portion **46*s*1 abuts the first engagement surface 92*s* of the arm 92. When the arm 92 is in the stand-by position, the first engagement surface 92*s* is inclined from the outside to the inside of a range of the first action portion 46*s*1 in the X-axis direction toward the downstream side in the attachment direction Y1, that is, inclined upward to the left side in FIGS. 19A and 19B. Therefore, the first action portion 46*s*1 presses the first engagement surface 92*s* to the left side in FIGS. 19A and 19B in accordance with the insertion of the cartridge tray 40, and thus pivots the arm 92 in a returning direction R2 against the urging force of the arm spring 93**.

Then, as illustrated in FIG. 19B, the abutting portion 941 of the locking member 94 is separated from the abutted portion 911 of the holder 91, thus a gap g is generated, and it becomes possible to move the locking member 94 with respect to the arm 92, that is, to pivot the locking member 94 in the clockwise direction in FIG. 19B. However, also in this state, the locking member 94 is urged in the clockwise direction r1 in FIG. 19B by the urging force of the locking spring 95, and abuts the wall surface 912 of the holder 91. Therefore, the locking member 94 stays in the locked position, and the locked state of the arm 92 is not released. That is, even if it is attempted to manually pivot the arm 92 in the pull-in direction R1 without moving the cartridge tray 40, the abutting portion 941 of the locking member 94 abuts the abutted portion 911 of the holder 91 again to restrict the pivoting of the arm 92.

Figure 20A:
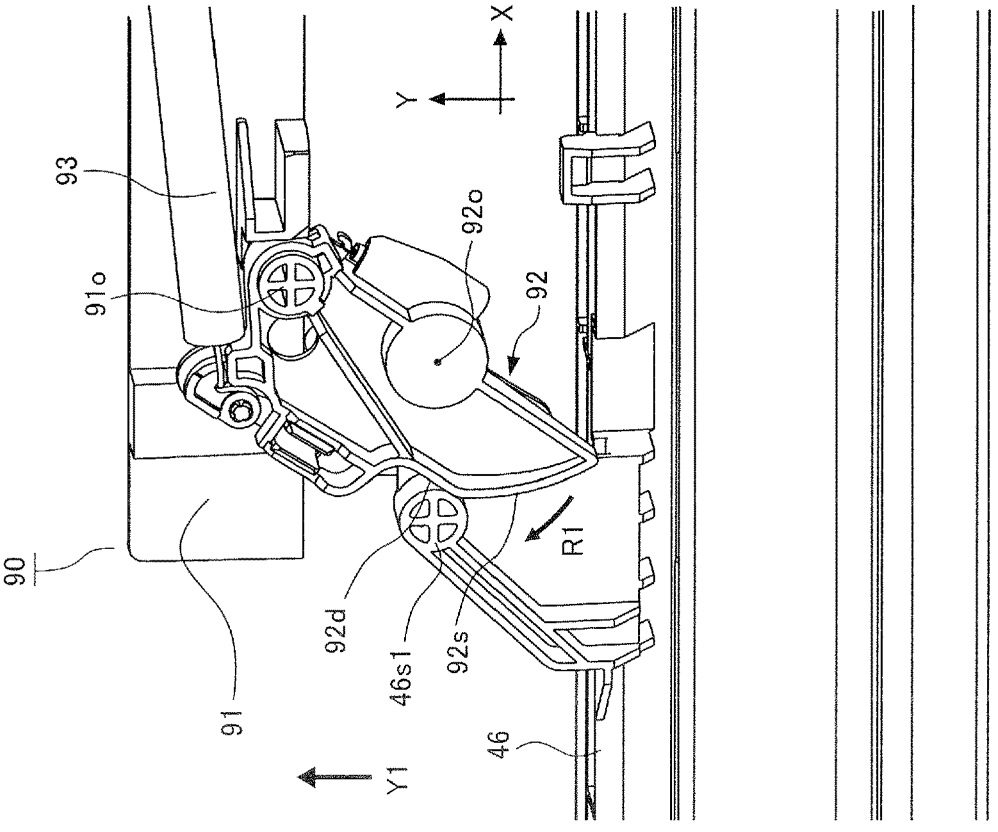

FIGS. 20A and 20B illustrate the lock-release operation having proceeded to the second stage as a result of the cartridge tray 40 being further inserted into the apparatus body. In this stage, the second action portion **46*s*2 presses the pressing portion 94*s* of the locking member 94 in a state in which the first action portion 46*s*1 of the cartridge tray 40 has pivoted the arm 92 in the returning direction R2 from the stand-by position. As a result of this, the locking member 94 pivots in a clockwise direction r2 in FIGS. 20A and 20B against the urging force of the locking spring 95, and the locking member 94 is retracted to a lock-release position where the abutting portion 941 does not face the abutted portion 911 of the holder 91**.

While the locking member 94 is pivoting from the locked position to the lock-release position, the arm 92 is kept in a state in which the arm 92 has been pivoted in the returning direction R2. In other words, the shape of the first engagement surface **92*s* is designed so as to secure such a pivot amount of the arm 92 that the locking member 94 can pivot to the lock-release position without interfering with the abutted portion 911. For example, this is satisfied in the case where the minimum distance from the pivot 92*o* of the locking member 94 to the abutted portion 911 is smaller than the pivoting radius of the abutting portion 941 about the pivot 92*o* during a period from the time when the second action portion 46*s*2 abuts the locking member 94 to the time when the abutting portion 941 is separated from the abutted portion 911**.

As a result of the second action portion **46*s*2 moving the locking member 94 to the lock-release position, a state in which pivoting of the arm 92 in the pull-in direction R1 is not hindered by the locking member 94, that is, the lock-release state is taken. That is, if the cartridge tray 40 is vanished while maintaining the positions of the arm 92 and the locking member 94 of FIGS. 20A and 20B, the arm 92 is pivoted in the pull-in direction R1 by the urging force of the arm spring 93**.

The second engagement surface 92*d* of the arm 92 engages with the first action portion 46*s*1 in a state in which the locking of the arm 92 is released by the second action portion 46*s*2. When the second engagement surface 92*d* engages with the first action portion 46*s*1, the pull-in force in the attachment direction Y1 starts acting on the cartridge tray 40 from the arm 92 due to the urging force of the arm spring 93. In other words, the second engagement surface 92*d* starts abutting the first action portion 46*s*1 in a surface region of the arm 92 that abuts the first action portion 46*s*1 and in a direction whose normal vector includes a positive component in the Y-axis direction, in the course of inserting the cartridge tray 40.

Figure 21B:
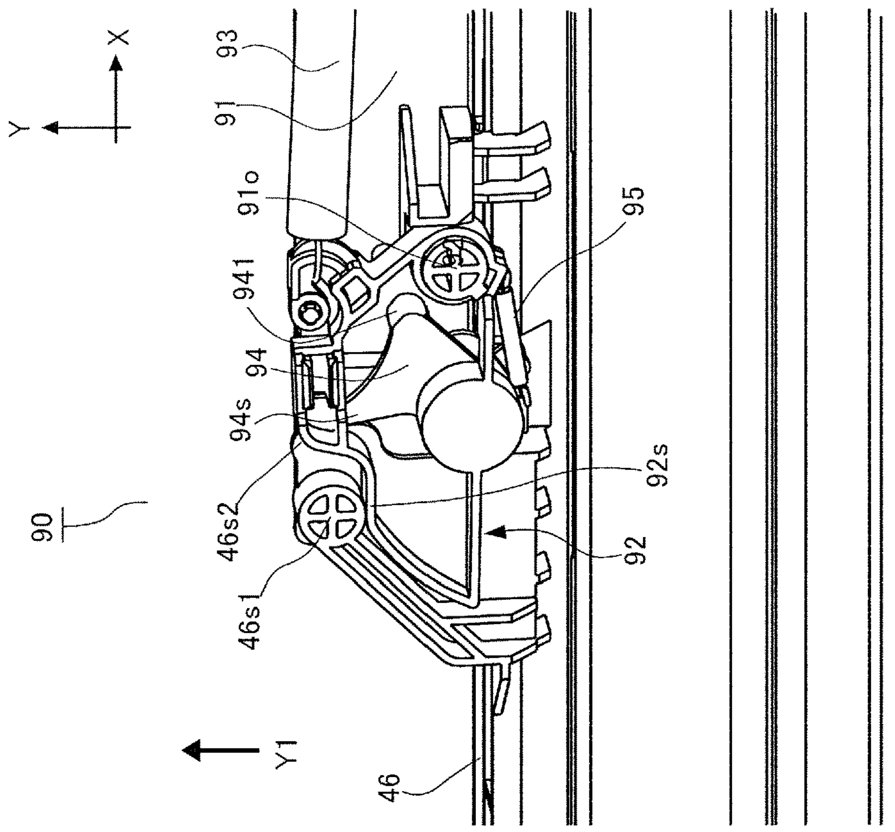
FIGS. 21A and 21B are each a diagram for describing an operation of the pull-in apparatus according to the first exemplary embodiment.
Figure 21A:
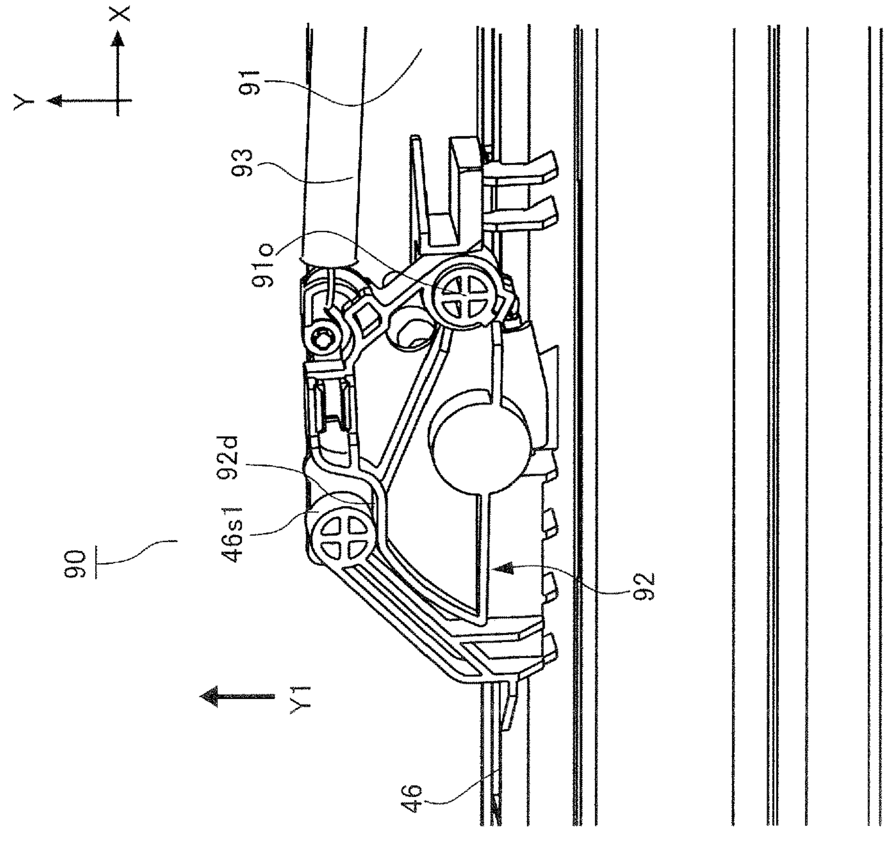

As illustrated in FIGS. 21A and 21B, when the arm 92 pivots from the stand-by position by a predetermined angle, which is about 45° in the present exemplary embodiment, while pulling in the cartridge tray 40 in the attachment direction Y1 by the urging force of the arm spring 93, the arm 92 reaches the pulled-in position. As a result of this, the cartridge tray 40 is attached to the attached position in the apparatus body.

When drawing the cartridge tray 40 out of the apparatus body, the pull-in apparatus 90 changes from the pulled-in state illustrated in FIGS. 21A and 21B to the stand-by state illustrated in FIGS. 18A and 18B by tracking back the pull-in operation described above. That is, the user or the like pulls the cartridge tray 40 in a draw-out direction opposite to the attachment direction Y1, and thus the first action portion 46*s*1 presses the second engagement surface 92*d* of the arm 92 in the draw-out direction. As a result of this, the arm 92 pivots in the returning direction R2, and the state of FIGS. 21A and 21B transitions to the state of FIGS. 20A and 20B. The locking member 94 pivots in the counterclockwise direction in FIGS. 20A and 20B by the urging force of the locking spring 95 while maintaining the state in which the pressing portion 94*s* is in contact with the second action portion 46*s*2, and returns to the locked position as illustrated in FIG. 19B.

When the cartridge tray 40 is drawn out further, the second action portion 46*s*2 is separated from the pressing portion 94*s* of the locking member 94. In addition, the first action portion 46*s*1 pivots the arm 92 in the returning direction R2 to a position beyond the stand-by position. Then, the arm 92 pivots in the pull-in direction R1 to the stand-by position while sliding on the first action portion 46*s*1 at the first engagement surface 92*s*, thus the abutting portion 941 of the locking member 94 abuts the abutted portion 911 of the holder 91, and the pull-in apparatus 90 takes the stand-by state illustrated in FIGS. 18A and 18B.

Summary of Pull-In Apparatus

The pull-in apparatus 90 of the present exemplary embodiment, having a configuration in which the pivoting of the arm 92 is locked in the stand-by state, requires two actions of (1) pivoting of the arm 92 in the returning direction R2 and (2) pivoting of the locking member 94. That is, in the case where (1) and (2) described above do not act on the pull-in apparatus 90 in this order, normally the locking of the arm 92 is not released. As a result of this, in the stand-by state as illustrated in FIGS. 18A and 18B in which the locking is yet to be released, high stability of the pull-in apparatus 90 can be realized. Here, high stability is defined by unlikeliness of occurrence of an event in which the locking of the arm 92 is accidentally released and the arm 92 unintentionally pivots, which may be caused in a case where, for example, the user's finger touches the pull-in apparatus 90 in the stand-by state.

Figure 22:
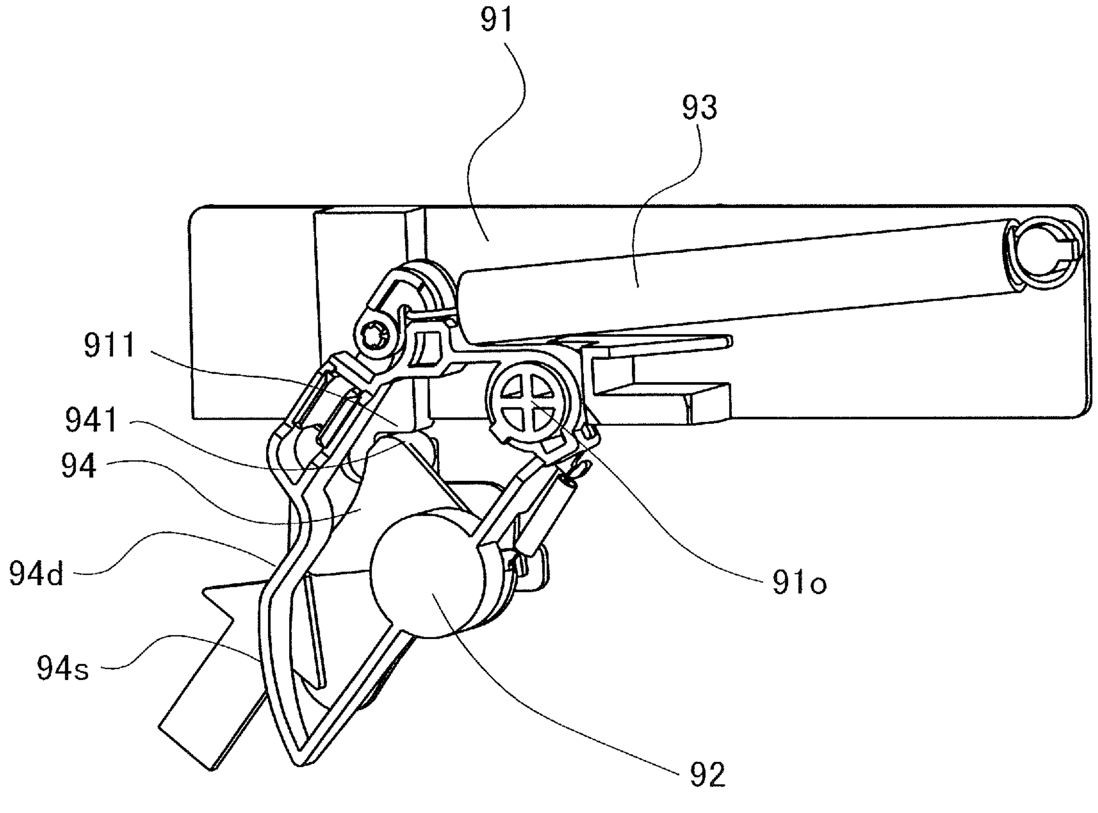
FIG. 22 is a diagram for describing an operation of the pull-in apparatus according to the first exemplary embodiment.

Further, in the configuration of the present exemplary embodiment, the locking member 94 is held in a gap between two portions of the arm 92, and this gap needs to be accessed to move the locking member 94. If it is attempted to release the locking by one action of moving the locking member 94 to the lock-release position in the state in which the arm 92 is in the stand-by position, the locking member 94 needs to be strongly pressed in an arrow direction of FIG. 22 as illustrated in FIG. 22. However, in the stand-by state, the locking member 94 is pressed against the abutted portion 911 of the holder 91 by the urging force of the arm spring 93, and a strong force is required for pivoting the locking member 94 in the clockwise direction in FIG. 22. Therefore, although an operation of inserting and pushing an object such as a ruler that is rigid and thinner than the interval z1 between the arm upper portion and the arm lower portion illustrated in FIG. 16B in the gap of the arm 92 is required, such an event occurring accidentally is unrealistic. Meanwhile, it is also unimaginable that a two-step operation of inserting an object such as a ruler in the gap of the arm 92 to pivot the locking member 94 after pivoting the arm 92 in the returning direction R2 is accidentally performed.

Therefore, according to the configuration of the present exemplary embodiment in which the locking member 94 is surrounded and protected by the arm 92, the stability of the pull-in apparatus 90 can be further improved. To be noted, in the present exemplary embodiment, the second action portion 46*s*2 is used as a second abutting portion, and the possibility of an object other than the second action portion 46*s*2 getting into the gap of the arm 92 is reduced by setting the thickness of the second action portion 46*s*2 to be smaller than the interval z1 of the arm 92. Even in the case of using a second abutting portion not having a plate-like shape instead of this, an effect similar to that of the present exemplary embodiment can be obtained by disposing the second abutting portion between a plurality of parts of the arm member.

In addition, in the pull-in apparatus 90 of the present exemplary embodiment, at least the arm spring 93 and the pivot support portion 91*o* of the arm 92 are disposed further on the rear side than the front side wall surface 35*a* of the fixing stay 35 illustrated in FIG. 14. According to such a configuration in which the number of members projecting toward the space in which the cartridge tray 40 is accommodated is small in the stand-by state, accidental contact with the pull-in apparatus 90 can be suppressed, and thus the stability can be further improved. To be noted, as illustrated in FIG. 16C, it is preferable to provide the arm 92 with a covering portion 92*k* that covers at least part of the locking spring 95 as viewed in the Y-axis direction in the stand-by state and provide the holder 91 with a covering portion 91*k* that overlaps with the locking member 94 as viewed in the vertical direction in the stand-by state. These elements also contribute to the improvement in the stability of the pull-in apparatus 90 by suppressing unintentional contact with the locking spring 95 or the locking member 94. In addition, a cover that covers a movable portion other than the arm 92 may be provided by using other plate metal frames or the holder 91 in addition to the fixing stay 35.

In addition, in the configuration of the present exemplary embodiment, the arm spring 93 urges the arm 92 in the pull-in direction R1 in the entire range from the stand-by position to the pulled-in position. Therefore, compared with a configuration used for a pull-in apparatus of a so-called toggle type in which the urging direction of the arm by the spring member changes within the range from the stand-by position to the pulled-in position, the distance to which the arm 92 is capable of pulling in the cartridge tray 40 can be set to be long. In the case of the pull-in apparatus of a toggle type, the pull-in action occurs after the arm passes a middle position. The pull-in action is weak near the middle position, and rather a force in a direction of pushing back the cartridge tray is applied before passing the middle position. In contrast, in the case of the present exemplary embodiment, the urging force of the arm spring 93 is efficiently transmitted as a force of moving the cartridge tray 40 in the attachment direction Y1 at the stage of FIGS. 20A and 20B before the pull-in action starts being in effect. As a result, the distance in which sufficient pull-in force can be exerted can be elongated as compared with the pull-in apparatus of a toggle type while avoiding increase in the size of the pull-in apparatus.

In addition, the present exemplary embodiment also has a good space-saving characteristic. In the state illustrated in FIGS. 21A and 21B in which the pull-in apparatus 90 has pulled in the cartridge tray 40 to the attached position, a range occupied by the pull-in apparatus 90 in the attachment direction Y1 is approximately a half of that in the stand-by state illustrated in FIGS. 18A and 18B. In addition, in the pulled-in state, the cartridge tray 40 is present in at least part of the space occupied by the arm 92 in the stand-by state. These characteristics enable securing an accommodation space for the cartridge tray 40 without increasing the size of the casing of the image forming apparatus, resulting in contribution to miniaturization of the apparatus.

To be noted, the pull-in apparatus 90 of the present exemplary embodiment has a configuration in which the force the cartridge tray 40 receives from the arm 92 in the course of the lock-release operation and the pull-in operation includes a component toward one side in the X-axis direction, which is the left side in FIGS. 20A and 20B. Although the illustrated structure may be disposed in the pull-in apparatus 90 in a state of being inverted with respect to the X-axis direction, in the present exemplary embodiment, the arrangement in which the component of the force in the X-axis direction is in a direction from the right side plate 37 to the left side plate 36 is employed as illustrated in FIG. 14.

Here, in the present exemplary embodiment, positioning of a photosensitive drum in the longitudinal direction in the case of performing an image forming operation after attaching the cartridge tray 40 to the apparatus body is performed by pressing the photosensitive drum leftward. Specifically, a driving coupling provided in the apparatus body presses the drum coupling 1*c* illustrated in FIG. 3A leftward, which is coaxially provided with the photosensitive drum.

In such a configuration, the pull-in apparatus 90 of the present exemplary embodiment is provided such that the direction of a component force applied to the cartridge tray 40 in a direction perpendicular to the attachment direction in the course of the pull-in operation coincides with the direction in which the photosensitive drum is pressed in the longitudinal direction in a state after the tray is attached. If these are opposite to each other, a guide shape that regulates the position of the cartridge tray 40 in the left-right direction at the time of inserting the cartridge tray 40 and another guide shape that receives a force that the cartridge tray 40 receives via the photosensitive drum after being attached and regulates the position of the cartridge tray 40 need to be provided separately. For example, the guide shape is a side wall that opposes the guide member 47L of the cartridge tray 40 in the left-right direction. In contrast, in the present exemplary embodiment, the directions of these forces coincide with each other, and therefore the position regulating function at the time of inserting the cartridge tray 40 and the position regulating function after the attachment can be realized by the same guide shape, and thus the configuration of the apparatus can be simplified.

In addition, as illustrated in FIG. 14, a contact t1 for connecting the photosensitive drums to the ground potential is provided on the cartridge tray 40, and a wire spring t2 connected to the ground potential is provided in the apparatus body. The contact t1 is electrically connected to a contact 1*b* of each process cartridge PP illustrated in FIG. 3B mounted on the cartridge tray 40, via a wire material 48 illustrated in FIG. 5 attached to the cartridge tray 40. When the cartridge tray 40 is attached to the attached position in the apparatus body, the wire spring t2 comes into pressure contact with the contact t1, and thus the photosensitive drums are grounded.

The contact t1 and the wire spring t2 are provided in a left end portion of the cartridge tray 40, and are not provided on the right side thereof. In such a configuration, the position at which the arm 92 presses the first action portion 46*s*1 in the attachment direction of the cartridge tray 40 in the attached state of the cartridge tray 40 is offset to the left side with respect to the center position of the cartridge tray 40 in the X-axis direction. Therefore, a force of the wire spring t2 pressing the cartridge tray 40 via the contact t1 and a force that the cartridge tray 40 receives from the pull-in apparatus 90 cancel each other, and thus inclination of the cartridge tray 40 is suppressed.

Further, as described above, the process cartridges PPY, PPM, PPC, and PPK are positioned not with respect to the apparatus body of the image forming apparatus but with respect to the cartridge tray 40. In such a case, the precision of the positioning may be degraded if the user is let perform the final positioning of the cartridge tray 40 by an insertion operation. In the case where the positioning precision of the cartridge tray 40 with respect to the body is low, the laser light irradiation position on the surface of the photosensitive drum 1 is displaced from an ideal position, resulting in displacement of an image position on the sheet. In contrast, according to the exemplary embodiment described above, since the positioning of the cartridge tray 40 with respect to the body is performed by the urging force of the arm spring 93 and the like, such a problem can be suppressed.

MODIFICATION EXAMPLE

In the present exemplary embodiment, as illustrated in FIGS. 20A and 20B, the first action portion 46*s*1 comes into frictional contact with the first engagement surface 92*s* of the arm 92 in the course of inserting the cartridge tray 40 in the pull-in apparatus 90. Therefore, it can be considered that the operational load of inserting the cartridge tray 40 becomes large depending on conditions such as the materials of the first action portion 46*s*1 and the first engagement surface 92*s* and the humidity. To address this, a rotary member having a columnar shape similarly to the first action portion 46*s*1 and pivotably supported by the cartridge tray 40 may be used instead of the first action portion 46*s*1 of the present exemplary embodiment. In addition, although the first action portion 46*s*1 serves as both of the portion that acts on the arm 92 in the initial stage of the lock-release operation and the portion that receives a pull-in force from the arm 92 after releasing the locking in the present exemplary embodiment, these portions may be provided as separate members.

In addition, the first engagement surface 92*s* of the arm 92 preferably has a shape that reduces fluctuation of the operational load of inserting the cartridge tray 40 to a position where pulling in of the cartridge tray 40 is started. For example, it is preferable that the first engagement surface 92*s* has an arcuate shape centered in a position away from the pivot support portion 91*o* of the arm 92 by a certain distance as viewed in the Z-axis direction. In addition, although all the components other than the springs 93 and 95 are formed from a resin material in the present exemplary embodiment, it can be also considered to form components that receive strong force, such as the arm 92, from a metal material. In addition, it can be also considered to use torsion coil springs or compressive springs for the springs instead of tension springs.

In addition, a pull-in operation similar to that of the present exemplary embodiment can be realized also in the case where the arm 92 and the locking member 94 are disposed in the cartridge tray 40 and the first action portion 46*s*1 and the second action portion 46*s*2 are disposed in the apparatus body. That is, the arm member and the restriction member may be disposed in one of the apparatus body and the unit, and the first abutting portion and the second abutting portion may be disposed in the other of the apparatus body and the unit. However, disposing the arm 92 and the locking member 94 that are movable members in the apparatus body as in the present exemplary embodiment is advantageous for reducing the weight and size of the cartridge tray 40 and suppress damage to the members.

Second Exemplary Embodiment

A pull-in apparatus according to a second exemplary embodiment will be described. In the first exemplary embodiment, since only one arm 92 is provided, the cartridge tray 40 is pressed leftward or rightward by the arm 92 when inserting the cartridge tray 40 in the apparatus body, which is a cause of generation of a frictional force between the apparatus body and the cartridge tray 40.

Figure 23:
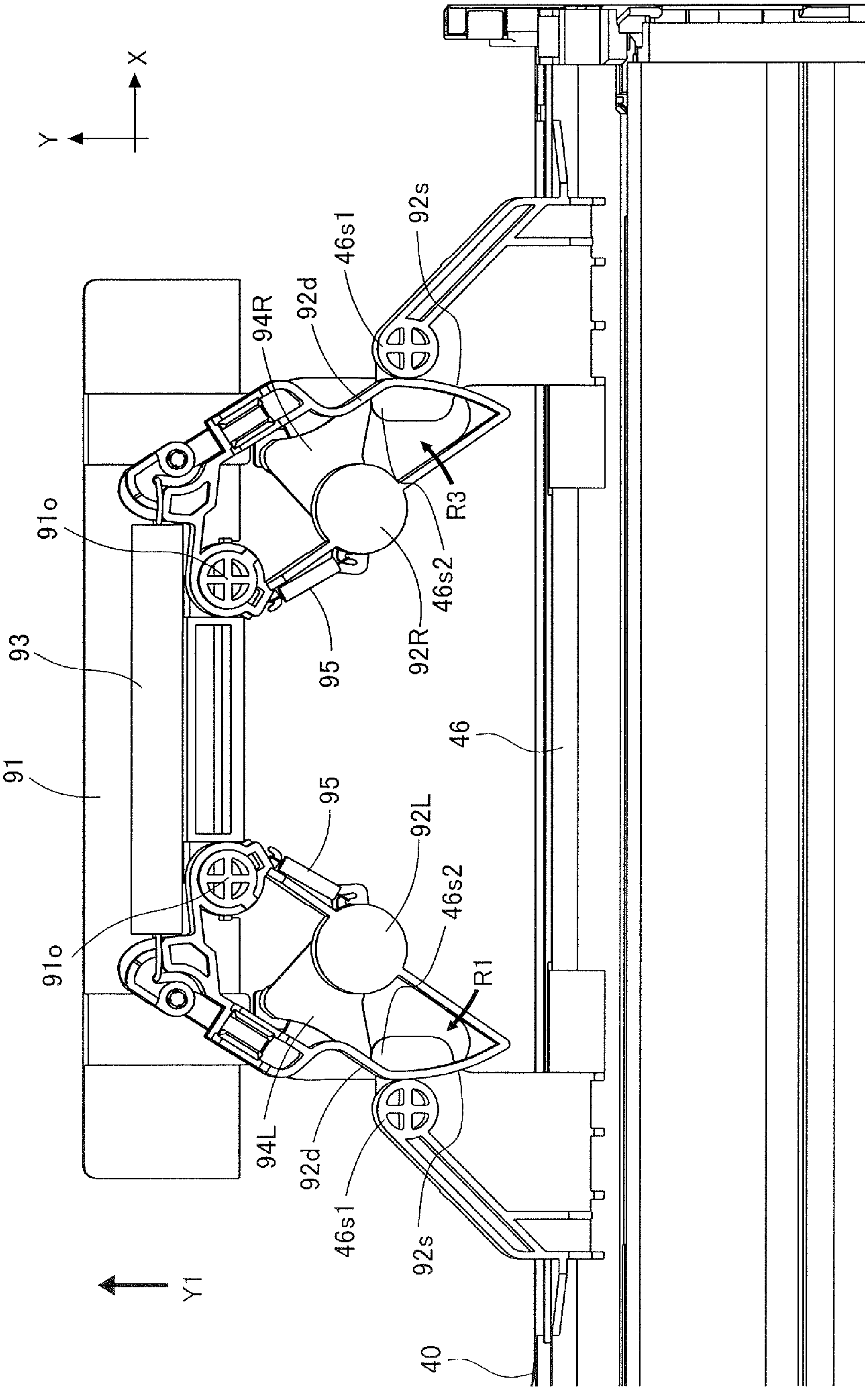
FIG. 23 is a top view of a pull-in apparatus according to a second exemplary embodiment.

In the present exemplary embodiment, two arms 92L and 92R are symmetrically arranged in the left-right direction as illustrated in FIG. 23. In addition, locking mechanisms similar to that of the first exemplary embodiment and including locking members 94L and 94R are symmetrically arranged in the left-right direction in correspondence with the arms 92L and 92R. Therefore, a pivot direction R3 of the arm 92R on the right side upon pulling in the cartridge tray 40 serving as a third direction is a rotational direction opposite to the pull-in direction R1 of the arm 92L on the left side. In addition, the arms 92L and 92R are respectively connected to two ends of the arm spring 93 serving as a common urging portion and receive urging force. In the case where the arm 92L and the locking member 94L on the left side serve as a first arm member and a first restriction member, the arm 92R and the locking member 94R on the right side serve as a second arm member and a second restriction member.

In the present exemplary embodiment, detailed configurations of the arms 92L and 92R and the locking members 94L and 94R and operations of the arms 92L and 92R and the locking members 94L and 94R at the time of inserting the cartridge tray are the same as those of the arm 92 and the locking member 94 of the first exemplary embodiment. Therefore, also according to the configuration of the present exemplary embodiment, a pull-in apparatus capable of suppressing erroneous release of the locking can be provided.

In addition, in the configuration of the present exemplary embodiment, in forces that the two arms 92L and 92R apply to two first action portions 46*s*1, components in the X-axis direction perpendicular to the attachment direction of the cartridge tray 40 cancel each other. As a result of this, friction between the cartridge tray 40 and the apparatus body can be reduced, and thus the operational load can be reduced. In addition, inclination of the cartridge tray 40 as viewed from above caused by the force received from the pull-in apparatus 90 during the inserting operation can be suppressed. Further, in the case where the same spring member as in the first exemplary embodiment is used as the arm spring 93, since the tension of the arm spring 93 acts on the cartridge tray 40 through the arms 92L and 92R respectively connected to the two ends of the arm spring 93, the force in the attachment direction received by the tray is approximately doubled. As a result, the required pull-in force can be secured even in the case where a spring member weaker than in the first exemplary embodiment is used, and therefore the cost of the arm spring 93 can be reduced.

Third Exemplary Embodiment

Figure 24:
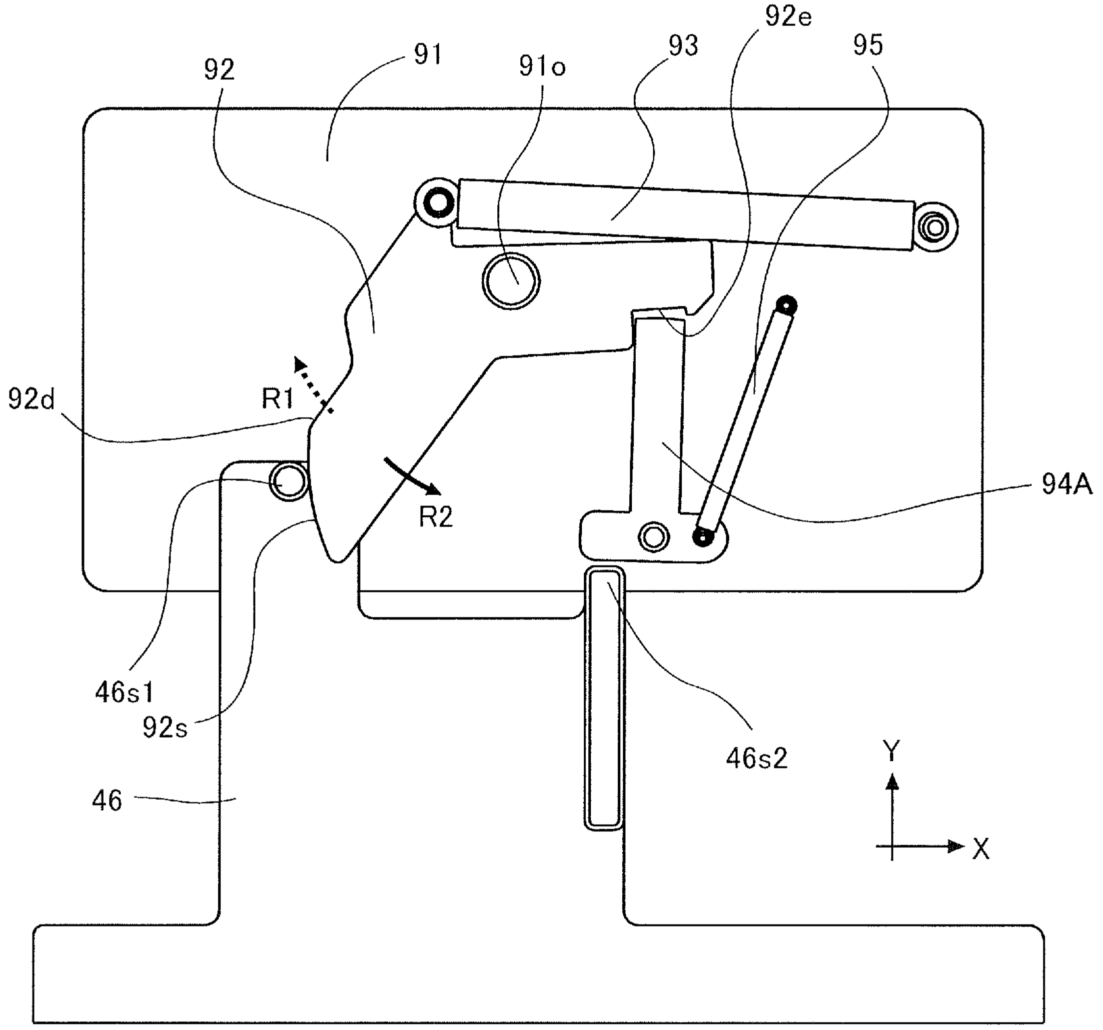
FIG. 24 is a top view of a pull-in apparatus according to a third exemplary embodiment.

A pull-in apparatus according to a third exemplary embodiment will be described. Whereas the arm 92 holds the locking member 94 in the first exemplary embodiment, in the present exemplary embodiment a locking member 94A is pivotably supported by the holder 91 as illustrated in FIG. 24. That is, the restriction member of the present exemplary embodiment is pivotably supported by the apparatus body separately from the arm member.

In the stand-by state, an engagement portion 92*e* of the arm 92 abuts the locking member 94A, and thus pivoting of the arm 92 in the pull-in direction R1 is restricted. When the cartridge tray 40 is inserted, the first action portion 46*s*1 provided on the tray presses the first engagement surface 92*s* of the arm 92 to pivot the arm 92 in the returning direction R2 from the stand-by position against the arm spring 93 as illustrated in FIG. 24. As a result of this, the engagement portion 92*e* of the arm 92 is released from the locking member 94A, and therefore it becomes possible to pivot the locking member 94A in the clockwise direction in FIG. 24. However, in the state illustrated in FIG. 24, the orientation of the locking member 94A is maintained by the urging force of the locking spring 95, and therefore the locking of the arm 92 is not released.

Figure 25:
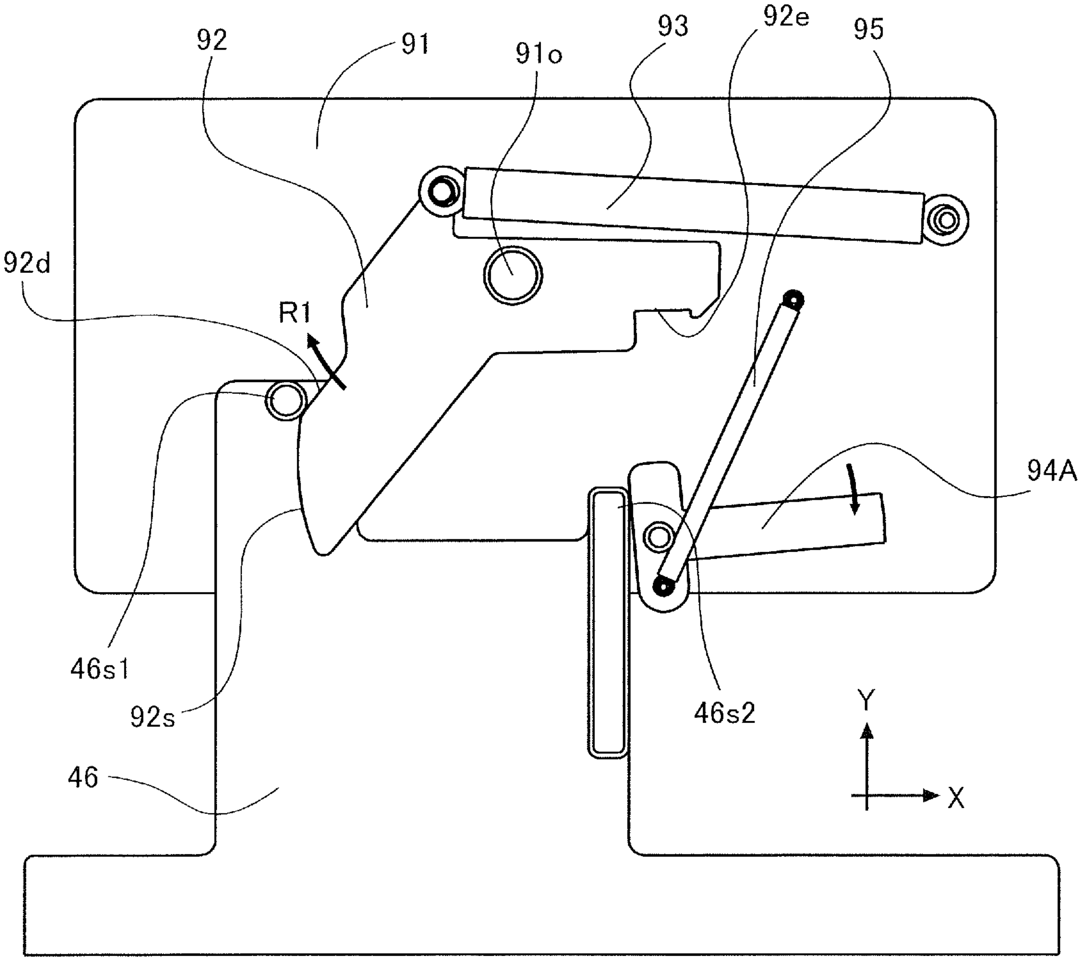
FIG. 25 is a top view of the pull-in apparatus according to the third exemplary embodiment.
Figure 26:
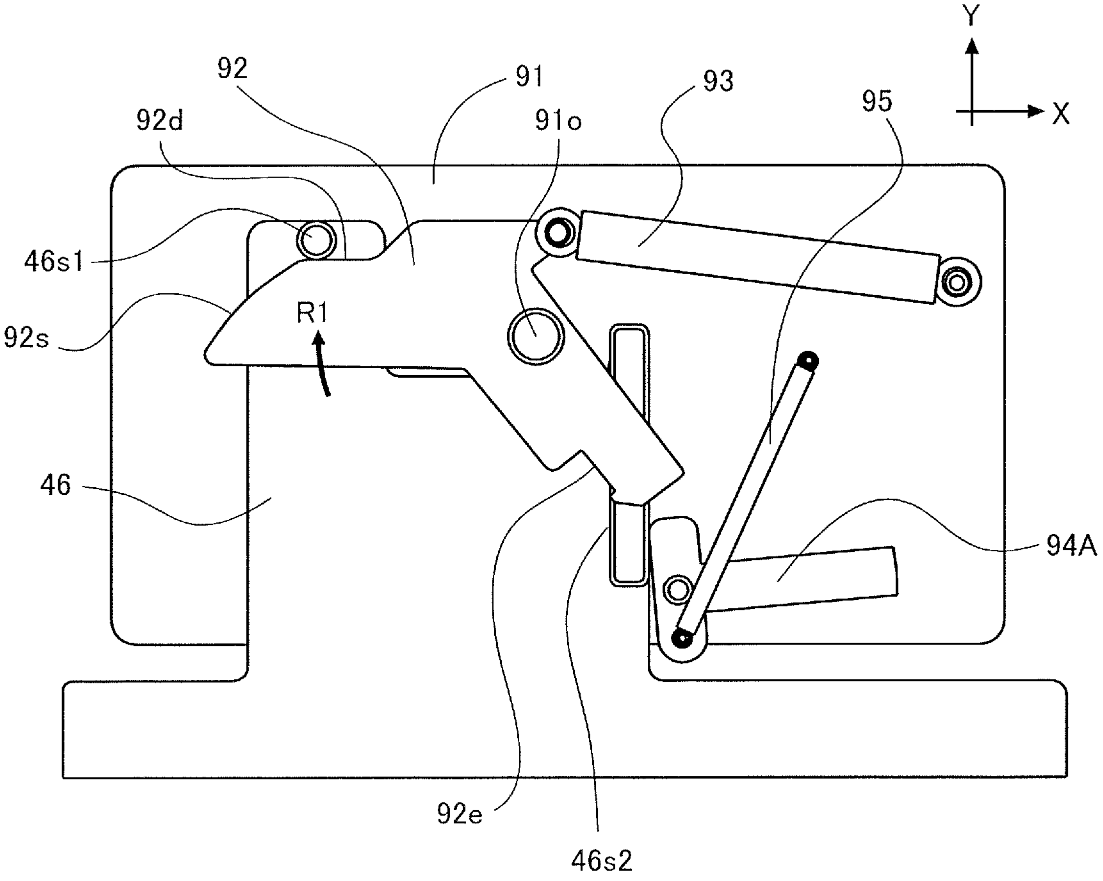
FIG. 26 is a top view of the pull-in apparatus according to the third exemplary embodiment.

When the cartridge tray 40 is further inserted, the second action portion 46*s*2 abuts the locking member 94A to pivot the locking member 94A in the clockwise direction in FIG. 25 against the locking spring 95 as illustrated in FIG. 25. As a result of this, locking of the arm 92 by the locking member 94A is released. Then, the arm 92 pivots in the pull-in direction R1 in accordance with the urging force of the arm spring 93 in a state in which the second engagement surface 92*d* of the arm 92 is abutting the first action portion 46*s*1, and thus the cartridge tray 40 is eventually pulled in to the position of FIG. 26.

Also in the present exemplary embodiment, two actions of (1) pivoting of the arm 92 in the returning direction R2 and (2) pivoting of the locking member 94A are required for releasing the locking of the arm 92. Therefore, also according to the configuration of the present exemplary embodiment, a pull-in apparatus capable of suppressing erroneous release of locking can be provided.

OTHER EMBODIMENTS

Although the pull-in apparatus 90 that pulls the cartridge tray 40 into the apparatus body has been described in the first to third exemplary embodiments above, this pull-in apparatus 90 is applicable to an arbitrary apparatus including a unit that can be drawn out of the apparatus body. For example, this can be applied to a configuration in which the cassette 19 illustrated in FIG. 2 serving as an example of a sheet accommodating portion that accommodates a sheet used as a recording medium is pulled into the apparatus body.

In addition, for example, this can be applied to a configuration in which a sheet processing apparatus or an option feeder attachable to and detachable from the apparatus body of an image forming apparatus is pulled into the apparatus body. The sheet processing apparatus is an apparatus that performs processing such as binding on sheets, and the option feeder is an apparatus that supplies a sheet to the apparatus body. In addition, the apparatus to which the pull-in apparatus is applicable is not limited to an image forming apparatus, and the pull-in apparatus is also applicable to, for example, a configuration in which a drawer of a desk for an office or a drawer of storage furniture is pulled into the apparatus body, that is, a casing.

In addition, although description has been given by using the printer 100 of an electrophotographic system in all of the embodiments described above, the present invention is not limited to this. For example, the present invention can be also applied to an image forming apparatus of an inkjet system that forms an image on a sheet by ejecting an ink liquid through a nozzle.

As described above, the present invention enables to suppress erroneous release of locking.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-027867, filed on Feb. 19, 2019, which is hereby incorporated by reference herein in its entirety.

What is claimed is:

1. An image forming apparatus comprising:

an apparatus body including a rear side and a front side opposite to the rear side;

a first cartridge including a first developing roller;

a second cartridge including a second developing roller;

a tray to which the first cartridge and the second cartridge are detachably attached, the tray including a first engaging portion configured to contact the first cartridge and a second engaging portion configured to contact the second cartridge, the tray being drawable from the apparatus body in a direction from the rear side to the front side;

a first arm member configured to move the tray toward a predetermined position by moving in a first direction so that the tray is moved in a direction from the front side to the rear side; and a first spring configured to urge the first arm member in the first direction.

2. The image forming apparatus according to claim 1, further comprising:

a locking member movable with respect to the first arm member between a lock position at which the locking member restricts movement of the first arm member in the first direction and a lock-release position at which the locking member allows the movement of the first arm member in the first direction.

3. The image forming apparatus according to claim 2, further comprising:

a restriction action portion configured to contact and move the locking member from the lock position to the lock-release position in a course of inserting the tray in the apparatus body.

4. The image forming apparatus according to claim 3, further comprising:

a first arm action portion configured to contact and move the first arm member positioned at a stand-by position in the course of inserting the tray in the apparatus body, wherein movement of the locking member from the lock position toward the lock-release position is restricted in a state in which the first arm member is at the stand-by position, and the movement of the locking member from the lock position toward the lock-release position is allowed in a state in which the first arm member has been moved from the stand-by position.

5. The image forming apparatus according to claim 4, wherein the restriction action portion and the first arm action portion are disposed such that the restriction action portion abuts the locking member after the first arm action portion has moved the first arm member.

6. The image forming apparatus according to claim 5, wherein the first arm action portion is configured to move the first arm member positioned at the stand-by position toward a direction opposite to the first direction.

7. The image forming apparatus according to claim 1, further comprising:

a second arm member configured to move the tray toward the predetermined position by moving in a second direction so that the tray is moved in the direction from the front side to the rear side; and a second spring configured to urge the second arm member in the second direction.

8. The image forming apparatus according to claim 7, further comprising:

a first locking member movable with respect to the first arm member between a first lock position at which the first locking member restricts movement of the first arm member in the first direction and a first lock-release position at which the first locking member allows the movement of the first arm member in the first direction; and a second locking member movable with respect to the second arm member between a second lock position at which the second locking member restricts movement of the second arm member in the second direction and a second lock-release position at which the second locking member allows the movement of the second arm member in the second direction.

9. The image forming apparatus according to claim 8, further comprising:

a first restriction action portion configured to contact and move the first locking member from the first lock position to the first lock-release position in a course of inserting the tray in the apparatus body; and a second restriction action portion configured to contact and move the second locking member from the second lock position to the second lock-release position in the course of inserting the tray in the apparatus body.

10. The image forming apparatus according to claim 9, further comprising:

a first arm action portion configured to contact and move the first arm member positioned at a first stand-by position in the course of inserting the tray in the apparatus body; and a second arm action portion configured to contact and move the second arm member positioned at a second stand-by position in the course of inserting the tray in the apparatus body, wherein movement of the first locking member from the first lock position toward the first lock-release position is restricted in a state in which the first arm member is at the first stand-by position, and the movement of the first locking member from the first lock position toward the first lock-release position is allowed in a state in which the first arm member has been moved from the first stand-by position, and wherein movement of the second locking member from the second lock position toward the second lock-release position is restricted in a state in which the second arm member is at the second stand-by position, and the movement of the second locking member from the second lock position toward the second lock-release position is allowed in a state in which the second arm member has been moved from the second stand-by position.

11. The image forming apparatus according to claim 10, wherein the first restriction action portion and the first arm action portion are disposed such that the first restriction action portion abuts the first locking member after the first arm action portion has moved the first arm member, and wherein the second restriction action portion and the second arm action portion are disposed such that the second restriction action portion abuts the second locking member after the second arm action portion has moved the second arm member.

12. The image forming apparatus according to claim 11, wherein the first arm action portion is configured to move the first arm member positioned at the first stand-by position toward a direction opposite to the first direction, and wherein the second arm action portion is configured to move the second arm member positioned at the second stand-by position toward a direction opposite to the second direction.

13. The image forming apparatus according to claim 1, wherein the tray is configured to support a photosensitive drum.

14. The image forming apparatus according to claim 13, further comprising:

a belt configured to contact the photosensitive drum.

15. The image forming apparatus according to claim 14, wherein the tray is located above the belt in a state where the tray is at the predetermined position.

16. The image forming apparatus according to claim 1, wherein the apparatus body includes a first side plate, a second side plate opposite to the first side plate, and a body shaft supported by the first side plate and the second side plate, and wherein the tray is configured to engage with the body shaft in a state where the tray is at the predetermined position.

17. The image forming apparatus according to claim 16, wherein the tray includes a tray shaft, wherein the tray shaft is configured to engage with the first side plate and the second side plate in the state where the tray is at the predetermined position.

* * * * *